US012618382B2

(12) United States Patent
Gonidec et al.

(10) Patent No.: US 12,618,382 B2
(45) Date of Patent: May 5, 2026

(54) THRUST REVERSER COMPRISING AT LEAST ONE DEPLOYABLE DEFLECTING MEMBRANE

(71) Applicant: SAFRAN NACELLES, Gonfreville-l'Orcher (FR)

(72) Inventors: Patrick Gonidec, Moissy-Cramayel (FR); Loïc Chapelain; Patrick André Boileau, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/877,913

(22) PCT Filed: Jun. 20, 2023

(86) PCT No.: PCT/FR2023/050911
§ 371 (c)(1),
(2) Date: Dec. 20, 2024

(87) PCT Pub. No.: WO2023/247883
PCT Pub. Date: Dec. 28, 2023

(65) Prior Publication Data
US 2025/0376963 A1      Dec. 11, 2025

(30) Foreign Application Priority Data
Jun. 22, 2022    (FR) ...................................... 2206143

(51) Int. Cl.
*F02K 1/72* (2006.01)
*F02K 1/64* (2006.01)
*F02K 1/68* (2006.01)

(52) U.S. Cl.
CPC .................. *F02K 1/72* (2013.01); *F02K 1/64* (2013.01); *F02K 1/68* (2013.01)

(58) Field of Classification Search
CPC ... F02K 1/64; F02K 1/645; F02K 1/70; F02K 1/72
See application file for complete search history.

(56) References Cited

U.S. PATENT DOCUMENTS 3,330,115 A * 7/1967 Markowski ............... F02K 1/68
244/113
3,366,349 A * 1/1968 Rudis ........................ F02K 1/68
60/230
(Continued)

FOREIGN PATENT DOCUMENTS

FR        3076864 A1    7/2019
FR        3087848 A1    5/2020
(Continued)

OTHER PUBLICATIONS

Search Report for International Application No. PCT/FR2023/050911 dated Oct. 25, 2023.

*Primary Examiner* — William H Rodriguez
(74) *Attorney, Agent, or Firm* — McDonald Hopkins LLC

(57) ABSTRACT

A thrust reverser (30) for an aircraft propulsion unit, the reverser comprising a stationary structure (31) and a movable structure (29) comprising at least one movable reverser cover (33) delimiting the secondary flow path (21B), the movable structure being translatable with respect to the stationary structure between an advanced direct-thrust position and a retracted thrust-reversal position in which the movable structure (29) and the stationary structure (31) axially define therebetween, on the secondary flow path, a radial extraction opening (56) for at least one portion (20B') of the secondary flow. The thrust reverser also comprises at least one deployable deflecting membrane (32, 32') which is designed to deflect the at least one portion (20B') of the secondary flow forwards. Moreover, in the deployed con-
(Continued)

figuration, the membrane (32, 32') extends radially outwards beyond the movable reverser cover (33).

14 Claims, 18 Drawing Sheets

(56)                    References Cited

U.S. PATENT DOCUMENTS

| | | | | |
|---|---|---|---|---|
| 6,158,211 | A * | 12/2000 | Gonidec ................... | F02K 1/70 |
| | | | | 60/226.2 |
| 11,459,979 | B2 * | 10/2022 | West .......................... | F02K 1/72 |
| 11,767,809 | B2 * | 9/2023 | West .......................... | F02K 1/72 |
| | | | | 60/226.2 |
| 12,044,193 | B2 * | 7/2024 | Pascal ........................ | F02K 1/70 |
| 12,060,850 | B2 * | 8/2024 | Gonidec ................... | F02K 1/70 |
| 12,429,013 | B2 * | 9/2025 | Chandelier ............... | F02K 1/72 |
| 2022/0243681 | A1 * | 8/2022 | West .......................... | F02K 1/72 |
| 2022/0316426 | A1 * | 10/2022 | Gonidec ................... | F02K 1/70 |
| 2023/0039569 | A1 * | 2/2023 | Pascal ........................ | F02K 1/60 |
| 2025/0109723 | A1 * | 4/2025 | Ferrier ...................... | F02K 1/72 |

FOREIGN PATENT DOCUMENTS

| | | | | | |
|---|---|---|---|---|---|
| FR | 3149045 | A1 * | 11/2024 | .............. | F02K 1/72 |
| WO | 2020229232 | A1 | 11/2020 | | |
| WO | WO-2024241010 | A1 * | 11/2024 | .............. | F02K 1/72 |
| WO | WO-2024241011 | A1 * | 11/2024 | .............. | F02K 1/72 |
| WO | WO-2025052068 | A1 * | 3/2025 | .............. | F02K 1/72 |
| WO | WO-2025133542 | A1 * | 6/2025 | ............. | F02K 1/763 |
| WO | WO-2025133543 | A1 * | 6/2025 | .............. | F02K 1/72 |

* cited by examiner

110

32

108

46B

THRUST REVERSER COMPRISING AT LEAST ONE DEPLOYABLE DEFLECTING MEMBRANE

CROSS-REFERENCE TO RELATED APPLICATIONS

This is the National Stage application of PCT international application PCT/FR2023/050911, filed on Jun. 20, 2023, which claims the priority of French Patent Application No. 2206143, filed Jun. 22, 2022, both of which are incorporated herein by reference in their entireties.

TECHNICAL FIELD

The invention relates to the field of nacelles and thrust reversers for an aircraft propulsion unit and more particularly to thrust reversers equipped with deployable membranes.

PRIOR ART

Thrust reversers are devices used to deflect the flow of air passing through the propulsion unit towards the front, so as to shorten landing distances and limit the load on the brakes on the landing gear.

The vane reversers currently used in the aeronautical sector comprise cascade vanes integrated into a fixed or mobile structure of the reverser. The mobile structure of the reverser includes one or more movable reverser cowls, and it is mounted so as to be movable in translation in relation to the fixed structure between a forward direct-thrust position, and a retracted reverse-thrust position.

In the retracted reverse-thrust position, in order to deflect at least some of the secondary flow towards the vanes, the reverser is usually equipped with sealing flaps which at least partially seal the secondary flow duct when deployed. In a known manner, this forces the air of the secondary flow radially outwards, in the direction of the vanes, which then generate the forward counter-thrust airflow.

The flaps are generally pivotably mounted on the radially internal wall of the movable reverser cowls, this wall delimiting the secondary flow duct radially outwards. Thus, recesses are provided in this radially internal wall of the reverser cowls in order to receive the sealing flaps in a retracted position, as adopted in direct jet. However, in direct jet, the presence of the recesses and flaps is a source of aerodynamic disturbances to the secondary flow. Moreover, this presence locally limits the installation of an acoustic panel on the radially internal wall of the reverser cowls.

To provide a technical solution to these problems, it has been proposed to replace the flaps by one or more deployable membranes for closing off the secondary flow duct. Such a design is, for example, known in document FR 3 076 864 A1.

Though the presence of deployable sealing membranes in the secondary duct makes it possible to limit the total mass of the reverser, the latter is still impacted by the presence of cascade vanes. These vanes in fact incorporate fins/blades intended to divert the flow forwards to obtain the counter-thrust function. The radial height of these diversion fins being limited by the need to house the cascade vanes inside the reverser in direct-jet configuration, it is sometimes necessary to increase the axial length of these vanes in order to have available the sufficient number of fins necessary for obtaining the required counter-thrust performances.

This increase in the length of the cascade vanes gives rise to an increase in the length of several components of the reverser, such as the movable cowl or cowls of the reverser, the actuators, etc. This inevitably leads to a greater mass of the reverser as well as to greater drag, synonymous with an increase in the specific fuel consumption.

DESCRIPTION OF THE INVENTION

To at least partially solve the drawbacks mentioned above, relating to the embodiments of the prior art, the object of the invention is first of all a thrust reverser for an aircraft propulsion unit, the reverser comprising a fixed structure equipped with a wall for the radially internal delimitation of a secondary flow duct of the propulsion unit intended to have a secondary flow pass through it, the reverser also comprising a movable structure comprising at least one movable reverser cowl equipped with a radially internal reverser cowl wall delimiting the secondary flow duct radially outwards, the movable structure being movable in translation with respect to the fixed structure on a longitudinal central axis of the reverser, between an advanced direct-thrust position and a retracted thrust-reversal position in which the movable structure and the fixed structure define axially between them, on the secondary flow duct, an opening for radial extraction of at least part of the secondary flow.

According to the invention, the thrust reverser also comprises at least one deployable deflecting membrane designed to divert said at least part of the secondary flow escaping from the radial extraction opening, when this deflecting membrane is in a deployed configuration adopted when the movable structure is in the retracted thrust-reversal position, and in this deployed configuration said at least one deflecting membrane extends radially outwards beyond the movable reverser cowl in the retracted thrust-reversal position.

Thus the invention proves advantageous in that it replaces all or some of the cascade vanes of the reverser with one or more deflection membranes capable of deploying to fulfil its counter-thrust function when the movable structure adopts its retracted thrust-reversal position. Such a deflection membrane has the advantage of compactness in the non-deployed configuration, adopted when the movable structure is in the advanced direct-thrust position, while being capable of extending radially outwards appreciably in its deployed position, to obtain satisfactory performances in terms of counter-thrust.

The solution proposed by the invention makes it possible to reduce the axial dimension of the reverser since the membrane or membranes proposed deflect the flow preferably forwards, channelling it towards an ejection section preferentially substantially perpendicular to the exit plane of the membranes. Thus the discharging surface area is always substantially equal to the exit cross section of the membranes, whereas, in the case of conventional vanes, the ejection takes place obliquely with respect to the external plane of the vane. In this case of the vanes, the more the jet is diverted forwards, the smaller the discharging surface area of the vane. Thus, to obtain a compatible output of the engine, it is then necessary to extend the vanes axially, with a consequent impact on the overall size of the reverser.

In the case of a membrane, the geometry thereof orients the flow, but it is the exit cross section thereof that causes the diversion of the flow, while remaining perpendicular to the exit speed of this flow.

With the solution according to the invention, it is thus possible to further incline the jet, and therefore to increase the counter-thrust performances thereof, without reducing the discharge surface area. Consequently, the length of the reverser is dependent on the length of any cascade vanes kept, depending on whether the latter are completely or partially replaced by membranes according to the invention.

The result is a saving in terms of mass and drag, with consequently an improvement in the specific fuel consumption. The costs are also reduced by implementing the invention. Furthermore, the overall performance of the propulsion unit is increased, thanks to the greater freedom in the choice of the aerodynamic shapes of the reverser in direct-jet mode, these shapes remaining more or less dependent on the need to house the cascade vanes in the reverser in the direct-thrust configuration.

It should be noted that, within the meaning of the invention, said at least one deployable deflecting membrane is a membrane of the reverser capable of generating an exit flow with a non-zero forward axial component, and/or a circumferential exit flow with a zero axial component.

The invention preferably has at least one of the following optional technical features, either separately or in combination.

According to a preferred embodiment of the invention, said at least one deflecting membrane includes a downstream deflecting membrane a concave deflecting active surface of which has a leading edge preferentially located at a rear axial end of the radial extraction opening, said concave active deflecting surface being pressurised by said at least part of the secondary flow escaping from the radial extraction opening.

According to another preferred embodiment of the invention, optionally combinable with the previous one, said at least one deflecting membrane includes an upstream deflecting membrane a convex deflecting active surface of which has a leading edge preferably located at a front axial end of the radial extraction opening, said convex active deflecting surface being put under negative pressure by said at least part of the secondary flow escaping from the radial extraction opening. Preferably, said downstream deflecting membrane includes, circumferentially on either side of its active concave deflecting surface, respectively two radial flanks conjointly delimiting, with the active concave deflecting surface, a channel deflecting forwards said at least part of the secondary flow escaping from the radial extraction opening. In other words, the downstream deflecting membrane then takes the overall form of a "hood".

For example, said deflecting channel delimits, by means of intermediate radial flanks, a plurality of deflection compartments circumferentially separated from each other. Alternatively, in the absence of intermediate radial flanks, the deflection channel remains the only one, non-compartmentalised.

Preferably, said downstream deflection membrane is secured to a support frame, preferably with an overall square or rectangular shape, arranged in the radial extraction opening.

Preferably, a plurality of deflection membranes follow each other circumferentially in the radial extraction opening, optionally in combination with cascade vanes also located in the radial extraction opening, between the deflection membranes.

Preferably, the upstream deflection membrane, in its deployed configuration, extends a rigid deflection edge of the fixed structure, or forms this same deflection edge.

Preferably, the reverser also comprises at least one deployable sealing membrane which, in a configuration deployed in the secondary flow duct, is designed to deflect said at least part of the secondary flow towards the radial extraction opening when the movable structure is in the retracted thrust-reversal position. Alternatively, a conventional system of sealing flaps could be used in the secondary flow duct, without departing from the scope of the invention. Preferably, in the deployed configurations of the downstream deflection membrane and of the sealing membrane, a trailing edge of the sealing membrane is offset axially downstream with respect to the leading edge of the active concave diversion surface of the downstream deflection membrane. This axial offset affords a gain in performances of the reverser, since part of the secondary flow escaping through the radial extraction opening, at a downstream end thereof, will also generate a strong negative pressure on the convex surface of the downstream membrane, opposite to the active concave diversion surface of this same downstream membrane.

Alternatively, the two membranes could be located in line with or substantially in line with each other, or even form together only a single membrane fulfilling the sealing functions in the radially internal part, and of the deflection in the radially external part.

Preferably, the reverser comprises one or more downstream deflection membranes as well as one or more upstream deflection membranes, delimiting together one or more necks for extracting a counter-thrust flow. Such a neck makes it possible to form a guide over 360° for the counter-thrust flow, thus limiting any obstacles liable to cause drag on this flow. The result is a saving in terms of performances of the reverser.

Preferably, said at least one deflection membrane is mounted on the fixed structure of the reverser.

Another object of the invention is a nacelle for an aircraft propulsion unit, comprising at least one fan cowl, as well as a thrust reverser as described above.

Finally, another object of the invention is a propulsion unit for an aircraft, comprising a turbine engine and such a nacelle.

Other advantages and features of the invention will become apparent in the non-limiting detailed description below.

BRIEF DESCRIPTION OF THE DRAWINGS

The following detailed description refers to the accompanying drawings in which.

DESCRIPTION OF THE EMBODIMENTS

Figure 1:
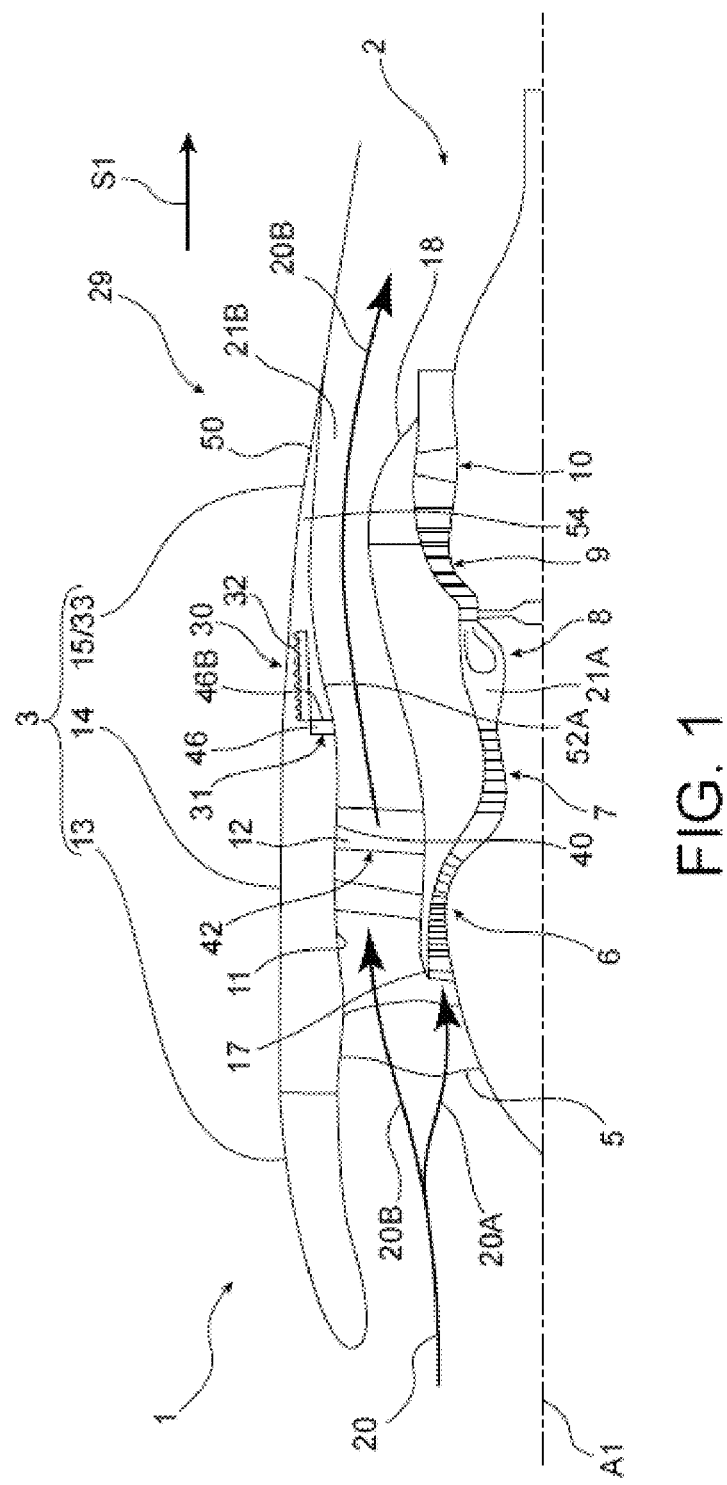
FIG. 1 is a schematic half-view in longitudinal section of a propulsion unit, comprising a thrust reverser shown in a direct-thrust configuration.

FIG. 1 shows an aircraft propulsion unit 1, having a longitudinal central axis A1.

Hereinafter, the terms "upstream" and "downstream" are defined with respect to a general direction S1 of gas flow through the propulsion unit 1 along the axis A1 when it generates a direct thrust. These terms "upstream" and "downstream" could respectively be replaced by the terms "front" and "rear" with the same meaning.

The propulsion unit 1 comprises a turbine engine 2, a nacelle 3 as well as a pylon (not shown) intended to connect the propulsion unit 1 to a wing (not shown) of the aircraft.

In this example, the turbine engine 2 is a bypass twin-spool turbojet engine comprising, from front to rear, a fan 5, a low-pressure compressor 6, a high-pressure compressor 7, a combustion chamber 8, a high-pressure turbine 9 and a low-pressure turbine 10. The compressors 6 and 7, the combustion chamber 8 and the turbines 9 and 10 form a gas generator. The turbojet engine 2 is provided with a fan casing 11 connected to the gas generator by structural arms 12.

The nacelle 3 comprises a front section forming an air inlet 13, a middle section which includes two fan cowls 14 enveloping the fan casing 11, and a rear section 15.

In operation, an air flow 20 enters the propulsion unit 1 through the air inlet 13, passes through the fan 5 and then splits into a primary flow 20A and a secondary flow 20B. The primary flow 20A flows in a primary gas flow duct 21A passing through the gas generator. The secondary flow 20B flows in a secondary flow duct 21B surrounding the gas generator. The secondary flow duct 21B is delimited radially inwardly by a fixed internal fairing which surrounds the gas generator. In this example, the fixed internal fairing comprises a first portion 17 belonging to the middle section 14, and a second portion 18 extending backwards from the first portion 17, so as to form part of the rear section 15. This second portion 18 forms an integral part of a fixed structure of a thrust reverser which will be described below. This same portion will hereinafter be referred to as the wall 18 internally radially delimiting the secondary flow duct 21B.

Radially outwardly, the secondary flow duct 21B is delimited by the fan casing 11, and, in the configuration shown in FIG. 1, by one or more movable reverser cowls 33 forming part of the rear section 15 of the nacelle 3, and which will be described below. More specifically, between the fan casing 11 and the reverser cowls 33, an outer shell 40 of an intermediate casing 42 is provided, the latter comprising the aforementioned structural arms 12, the radially external end of which is fixed to this shell 40. It therefore also helps delimit the secondary flow duct 21B radially outwardly, being located in the downstream axial extension of the fan casing 11.

The nacelle 3 therefore includes a thrust reverser 30 (shown only schematically and partially in FIG. 1), centred on the axis A1 and comprising, on the one hand, a fixed structure 31 secured to the fan casing 11, and, on the other, a structure 29 that can be moved in relation to the fixed structure 31. The fixed structure 31 includes for example a front frame 46 that fixedly connects it to the fan casing 11, preferably via a knife-edge flange assembly located downstream of the outer shell 11. This front frame 46 contains a profiled aerodynamic part called deflection edge 46B, which guides the flow in reversed jet.

In this preferred embodiment, the fixed structure 31 also includes one or more deployable deflection membranes 32, one of which is shown schematically in a non-deployed configuration on FIG. 1.

Moreover, the movable structure 29 comprises for its part the aforementioned movable reverser cowls 33, for example two cowls 33 each extending over an angular range of around 180°. This configuration with two cowls 33 is particularly well suited in the case of a nacelle design wherein the cowls/walls 18 are also mounted in an articulated manner, the reverser 30 then having a so-called "D-duct" architecture. In this architecture, the cowls 18, 33 are connected so as to open/shut simultaneously during maintenance operations on the engine. However, other structures are possible, such as for example a so-called "C-duct" architecture or a so-called "O-duct" architecture.

Each reverser cowl 33 includes a radially external internal wall 50 forming a nacelle external aerodynamic surface, as well as a radially internal wall 52, helping to delimit the secondary flow duct 21B radially outwardly. This wall 52 is in the downstream continuity of the deflection edge 46B, in direct thrust configuration. The two walls 50, 52 define a housing 54 open axially at the upstream end of the reverser cowl 33, and wherein at least some of the deflection membranes 32 are located in direct-thrust configuration.

FIG. 1 shows the reverser 30 in a forward-thrust configuration, referred to as "direct jet", corresponding to a standard flight configuration. In this configuration, the cowls 33 of the movable structure 29 are in a closed position, referred to as the advanced thrust or "direct jet" position, in which these reverser cowls 33 are in abutment on the fixed structure 31, in particular on the deflection edge 46B forming an integral part of the latter. This is because, in the direct thrust configuration, the upstream end 52A of the radially internal wall 52 of each cowl 33 is axially bearing against the deflection edge 46B.

The movable structure 29 is thus translationally movable in relation to the fixed structure 31 along the axis A1 of the reverser, between the forward direct-thrust position shown in FIG. 1, and a retracted reverse-thrust position that will be described below. In the forward direct-thrust position of the movable structure 29, the deflection membrane or membranes 32 in folded/non-deployed configuration are arranged in the housing 54 of the reverser cowls 33, while being isolated from the secondary flow duct 21B by the radially internal wall 52 of these sliding cowls 33. This wall 52, forming the external wall of the secondary flow duct, is also called an acoustic internal panel.

Figure 2:
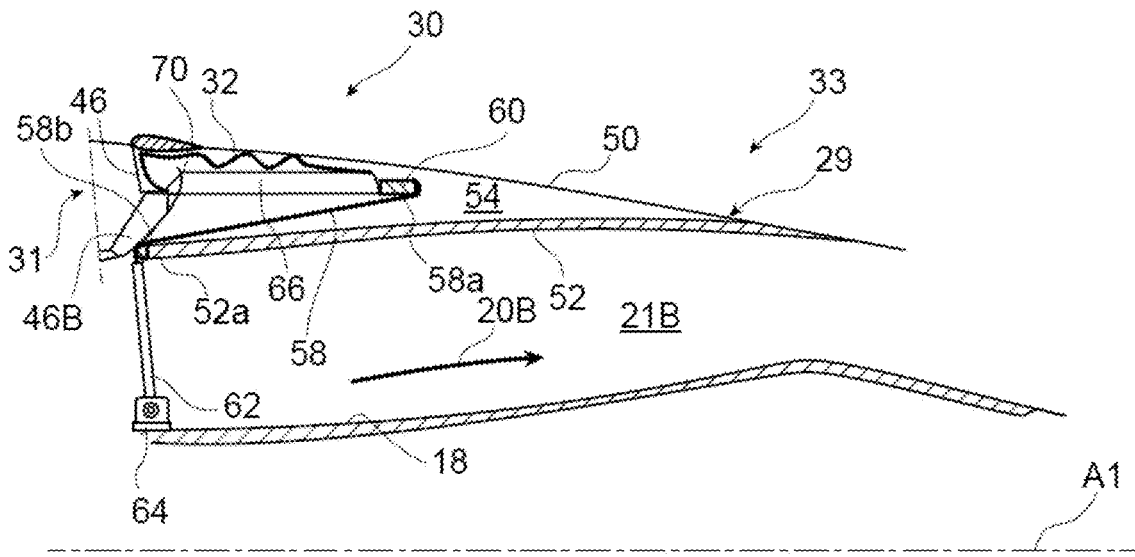
FIG. 2 is a view in longitudinal half-section of the reverser equipping the propulsion unit shown on FIG. 1, with the reverser in the form of a first preferred embodiment of the invention, and shown in a direct-thrust configuration.
Figure 3:
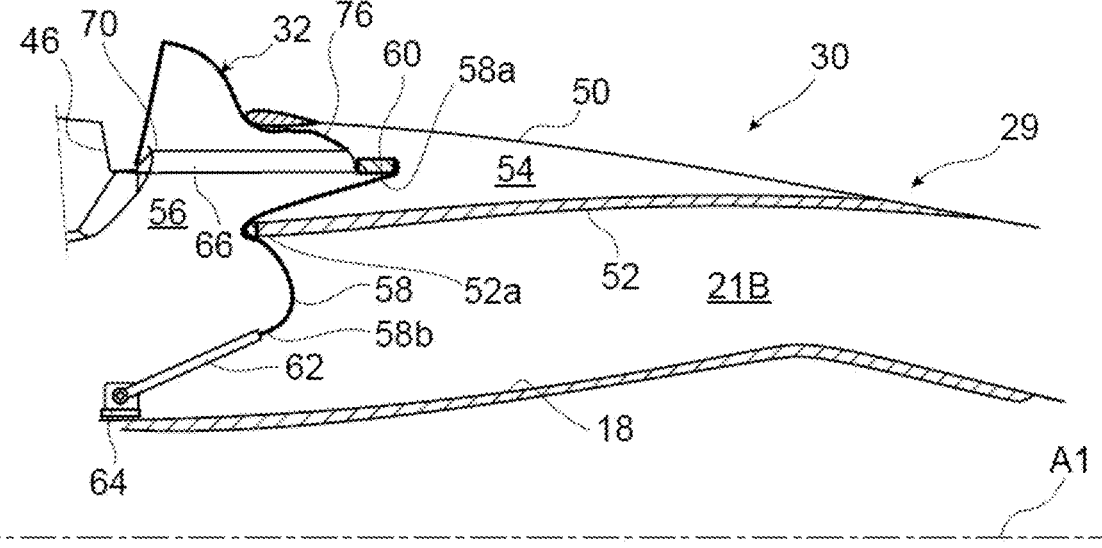
FIG. 3 is a view in longitudinal half-section similar to the one in the previous figure with the reverser shown in a configuration intermediate between the direct-thrust configuration and the thrust-reversal configuration.
Figure 4:
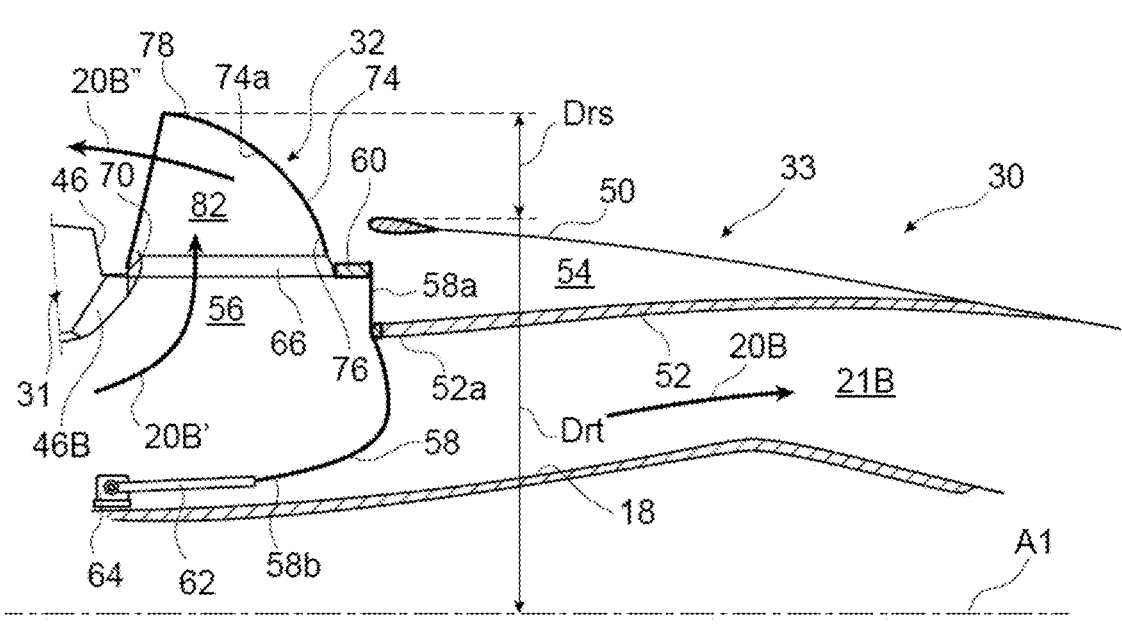
FIG. 4 is a view in longitudinal half-section similar to the one in the previous figure with the reverser shown in a thrust-reversal configuration.

The direct-thrust configuration is also shown on FIG. 2, while the retracted thrust-reversal position of the movable structure 29 is shown on FIG. 4. FIG. 3 shows the reverser in a position intermediate between the positions in FIGS. 2 and 4. All of FIGS. 1 to 5 show a first preferred embodiment of the present invention.

On FIG. 4, it is shown that the deflection edge 46B and the upstream end of the movable cowl 33 delimit axially between them, on the secondary flow duct 21B, an opening 56 for the radial extraction of at least part 20B' of the secondary flow 20B. This opening 56 of the secondary flow duct 21B is therefore delimited towards the upstream end by the deflection edge 46B which, conventionally, splays radially outwards going towards the rear, to delimit an airflow 20B' intended to pass through this opening 56 when the movable system is in this retracted thrust-reversal position. In other words, the deflection edge 46B, here produced rigidly, gradually moves away from the axis A1 going from front to rear, to guide/deflect the air through the opening 56 and towards the deployable deflection membrane 32, in the thrust-reversal configuration. On the other hand, this opening 56 of the secondary flow duct 21B is in particular delimited towards the downstream end by the upstream end 52A of the radially internal part 52 of the cowl 33, but also by the upstream end of the radially external wall 50 of this same cowl. As will be described subsequently, FIG. 5A shows in more detail the role of the solid extension of the deflection edge included in the solid structure carrying the membrane 32, and the interaction thereof with the geometry of the latter in order to obtain the most even flow possible at the discharge from the reverser.

In order to force at least part 20B' of the secondary flow 20B towards the opening 56, the reverser 30 includes one or more sealing membranes 58. Hereinafter, only one membrane 58 will be described, the assembly of which has for example an angular amplitude identical or similar to that of all the deflection membranes 32 that will be described subsequently, and which is located in the same axial and radial plane of the propulsion unit. Thus a plurality of circumferentially adjacent membranes 58 can therefore be provided in the secondary flow duct 21B. Nevertheless, the angular extent of the sealing membrane 58 can be greater than that of the deflection membrane 32 without departing from the scope of the invention.

The membrane 58 can be made of a material known to the person skilled in the art for this type of application. For example, it can be a non-impregnated fabric, for example aramid fibres. The membrane 58 may also be made with a composite material the matrix of which is particularly flexible, for example made from aliphatic polyurethane, which makes it possible to use it in different temperature conditions, in particular lower temperatures in the case of a membrane made of aliphatic polyurethane than in the case of a membrane made of silicone. The matrix gives a low bending recovery capacity and the behaviour of the structure obtained is indeed that of a membrane. One of the major properties of this sealing membrane 58 is to be able to fold perfectly reversibly (elastic or by sliding of fibres) with a very small radius of curvature compared with its surface area, and to have a very small thickness, for example of the order of 0.1 to 3 mm. By way of information, it should be noted that this membrane 58 behaves like a boat sail or a parachute/a sail wing when it is put under pressure.

A first end 58a of the sealing membrane 58 is secured to a rear framework 60 belonging to the fixed structure 31, this framework being located in or in proximity to a rear axial end of the opening 56. Furthermore, a second end 58b of the sealing membrane 58, opposite to the first membrane end 58a, is secured to the wall 18. It should be noted that the first end 58a can be secured to the rear of the rear framework 60 as shown on the figures, or at the front of this same framework.

To do this, linkages 62 can be used, where a first end of each them is mounted on the wall 18, preferably by means of a pivot or swivel connection 64. This connection 64 can be implemented by means of a bracket secured to the fixed wall 18 and engaging with the first linkage end 62a. The linkages 62 are spaced apart circumferentially from each other in the secondary flow duct 21B, and the number thereof can vary.

Each linkage 62 is designed to move from a position projecting radially in the secondary flow duct 21B, a position shown on FIG. 2 and adopted when the movable structure 29 occupies its forward direct-thrust position, to a position folded downstream, shown on FIG. 4 and adopted when the movable structure 29 occupies its retracted thrust-reversal position. In the projecting position, each linkage 62 can adopt a radial or substantially radial orientation with respect to the axis A1, while in the folded position each linkage can adopt an axial or substantially axial orientation.

Elastic means, referred to as elastic return means (not shown), tend to slope each linkage 62 towards its folded/lying position in FIG. 4, in particular when the linkage is in its projecting position corresponding to the flight position of the reverser. Thus, at the start of deployment of the reverser, each linkage 62 exerts on the membrane 58 a rearward and downward thrust that pulls it into the flow duct so that the flow that rushes into the housing 54 at the start of transit does not jam the membrane in this housing 54 of the fan cowls 33.

The second end of each linkage 62, opposite to the first end, can be connected directly to the second end 58*b* of the membrane 58. Nevertheless, other preferential solutions are adopted, such as those aimed at incorporating reinforcement cables and/or straps in the means for attaching the membrane 58 to its associated elements 18, 60.

It should be noted that the linkages 62 are positioned axially so that the path of their second end is tangent or substantially tangent to the interior surface of the acoustic panel 52 in its front part, or so that the path is descending in the flow duct.

As can be seen on FIG. 2, when the movable structure 29 occupies its forward direct-thrust position, at least a part of the sealing membrane 58 is arranged radially outwards with respect to the radially internal wall 52 of the reverser cowl 33, in the housing 54. Thereby, when the movable structure 29 adopts its forward direct-thrust position, the second end 58*b* of the sealing membrane 58 is gripped between the upstream end 52A of the wall 52 and the deflection edge 46B. In order to avoid any degradations of the membrane 58 because of this gripping, the deflection edge 46B can locally have a cutout with a shape adapted to receive the upstream end 52A of the wall 52. Thus the membrane 58 is also pressed against this cutout in the deflection edge 46B, by the bearing of the upstream end of the wall 52.

As can be seen on FIGS. 3 and 4, when the movable structure 29 moves and occupies its retracted thrust-reversal position at the end of this movement, the sealing membrane 58 is partly in abutment against the upstream end 52A of the radially internal wall 52 of the reverser cowl, therefore corresponding to the acoustic panel. More precisely, during the rearward movement of the movable structure 29, the membrane 58 slides over this upstream end 52A of the radially internal wall 52.

In the retracted thrust-reversal position of FIG. 4, the membrane 58 is therefore in axial abutment downstream against the upstream end 52A. It should be noted that, depending on the extent of the axial travel of the reverser, the membrane 58 may no longer be in contact with the internal acoustic panel 52 in the completely deployed position of the reverser, where the cowl 33 is in its most retracted position. The option with contact corresponds to a minimised travel of the reverser, while the option without contact in general corresponds to a form of membrane that is smoother in reverse jet, and therefore more efficient from an aerodynamic point of view.

Thus the part of the membrane 58 that is located radially towards the outside with respect to its zone of abutment on the wall 52 closes off part of the upstream axial opening of the housing 54, while the other part located radially towards the inside closes off at least part of the secondary flow duct 21B, in this way deflecting at least a part 20B' of the secondary flow 20B towards the opening 56 in the direction of the deployable deflection membrane 32, specific to the present invention. The material used for producing the membrane 32 is any one among those already mentioned above for producing the sealing membrane 58.

In this first preferred embodiment, the membrane 32 corresponds to a downstream deflection membrane that is secured to a support frame 66, preferably with an overall square or rectangular shape, and arranged axially in the radial extraction opening 56. By way of indication, it should be noted that the two rear corners of the frame 66 are preferentially rounded.

Figure 5:
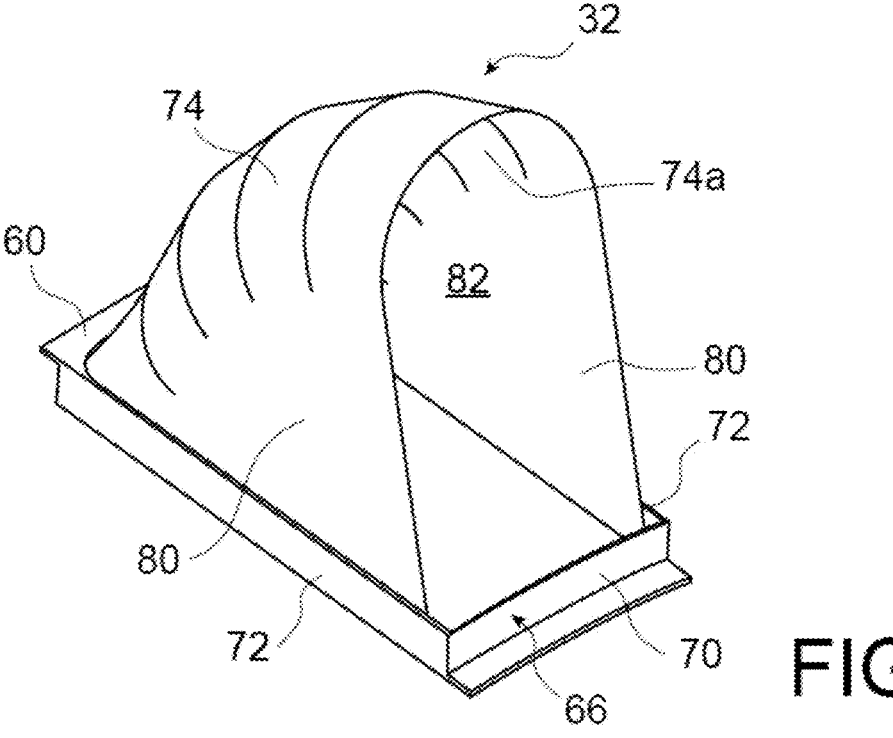
FIG. 5 is a perspective view showing the deflection membrane of the reverser shown on the previous figure, in a deployed configuration of the membrane.
Figure 5A:
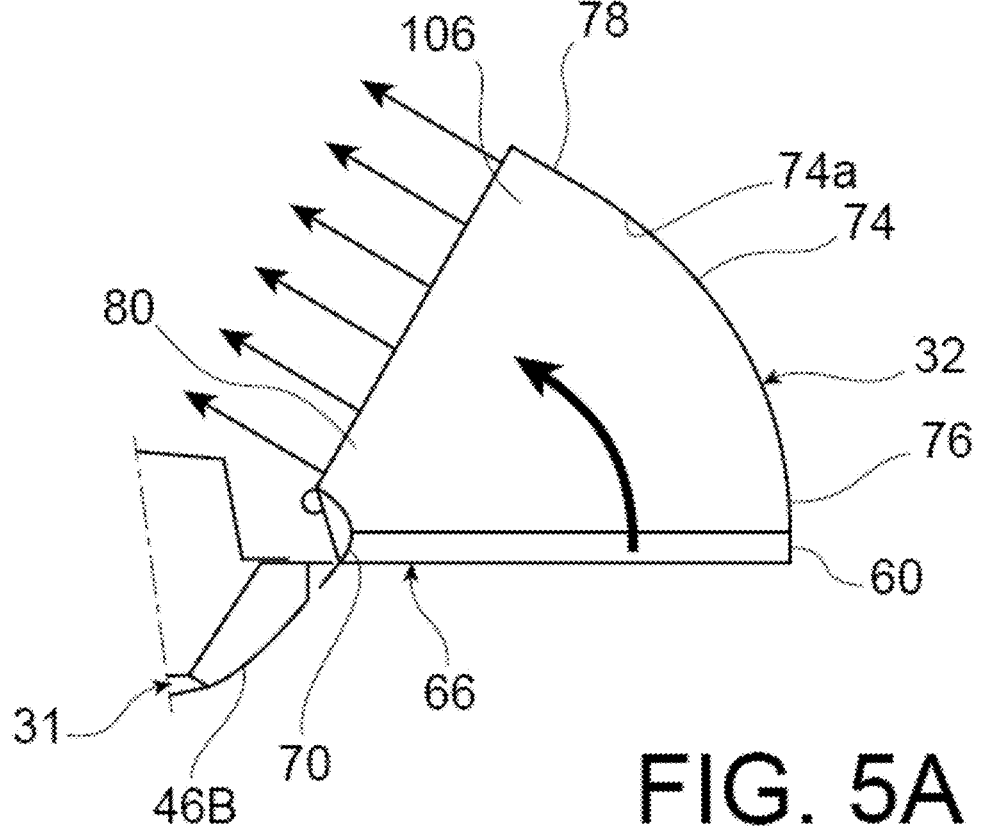
FIG. 5A is a view in longitudinal half-section showing the aerodynamic continuity between the deflection edge of the fixed structure of the reverser, and the support frame of the deflection membrane.

This frame 66 can be seen better on FIG. 5. It comprises the aforementioned rear framework 60, a front framework 70, and two axial uprights 72 connecting the two frameworks. As can be seen on FIG. 4, the axial length of the support frame 66 is identical or substantially identical to the axial length of the opening 56.

More precisely, the downstream deflection membrane 32 includes a main deflection portion 74, an active concave deflection surface 74*a* of which has a leading edge 76 secured to the rear framework 60, this leading edge therefore been located at a rear axial end of the radial extraction opening 56.

FIG. 5A shows that the front framework 70 of the support frame 66 has a function of solid extender of the deflection edge 46B, since it has a profiled form located in aerodynamic continuity of the latter. This bypass zone with a small radius of curvature, formed by the front framework 70, makes it possible to obtain an exit jet with a homogeneous direction substantially perpendicular to the trailing output section of the main deflection portion 74 of the membrane 32, located at a trailing edge 78 thereof.

Moreover, at this trailing edge 78, it should be noted that the membrane 32 can be equipped with a fabric reinforcement 106 shown on FIG. 5A, in particular to reinforce the parallelism of its radial flanks 80.

In operation, the secondary stream 20B passes through the secondary flow duct 21B, and comes at least partly to abut on the deployed sealing membrane 58, which forces a part 20B' of this flow to pass through the opening 56, and therefore to pass through the opening defined internally by the support frame 66. The flow of the flow part 20B' through the extraction opening 56 thus has the consequence of pressurising the active concave deflection surface 74*a*, and therefore of deploying the deflection membrane 32 as far as its fully deployed configuration shown on FIGS. 4 and 5 and 5A.

The main deflection portion 74, and the interior active concave deflection surface 74*a* thereof, have the same curved shape that makes it possible to gradually divert the flow part 20B' initially of radial or substantially radial orientation emerging from the opening 56, to result in a counter-thrust flow 20B" oriented forwards, for example with a significant component parallel to the axis A1. This direction of the counter-thrust flow 20B", which can be adapted according to the requirements encountered, is substantially parallel to a tangent to the trailing edge 78 of the main deflection portion 74 and of its active concave deflection surface 74*a*. The main portion 74 and its internal active surface 74*a* can for example extend in the form of an arc of a circle or similar, preferably over an angular extent of between 75 and 90°.

On FIG. 2, the membrane 32 is shown in folded/non-deployed configuration, as adopted when the movable structure 29 of the reverser is in the forward direct-thrust position. The folded membrane 32 is thus in the housing 54 of the movable reverser cowl 33, while being covered radially by the wall 50 of this cowl, and being preferentially arranged radially towards the outside with respect to the sealing membrane 58, also non-deployed.

The membrane 32 also includes, circumferentially on either side of its main deflection portion 74, respectively two radial flanks 80 visible on FIG. 5. The interior surface of these two radial flanks 80 conjointly delimit, with the active internal concave deflection surface 74*a* of the main portion 74, a channel 82 for forward deflection of the part 20B' of the secondary flow escaping from the radial extraction opening 56, to then generate the counter-thrust flow 20B". With the presence of these radial flanks 80 that run along and are respectively secured to the two axial uprights 72 of the support frame 66, the downstream membrane 32 takes a roughly "hood" shape, the channel 82 thereof that it delimits internally having a form angled towards the front, changing from a radial or substantially radial orientation to an axial or substantially axial orientation. To do this, each axial flank 80 of the membrane 32 adopts a roughly triangular, almost planar, shape, with one of its sides arched, following the concave shape of the active deflection surface 74*a*. One of the particularities of the invention therefore consists in providing the deployable deflection membrane 32 to preferentially deflect forwards the part of the flow 20B' escaping from the opening 56, when this deflection membrane is in the deployed configuration of FIG. 4. However, as indicated previously, the forward deflection of the float 20B' is a preferential feature not essential to the invention, since the reverser can be capable of generating an exit flow with a non-zero forward axial component, and/or a circumferential exit flow with a zero axial component.

In addition, for increased performances of the reverser and for a smaller sizing thereof, in this deployed configuration the downstream membrane 32 extends radially outwards beyond the movable reverser cowl 33 in the retracted thrust-reversal position. The membrane 32 can thus extend beyond the wall 50 of the cowl 33 over a projecting radial distance "Drs".

It should be noted that the meridian section of the membrane 32 can advantageously be a circle. This membrane then has a height equal to the axial length of the aperture formed by the support frame 66 of the membrane in the form of a hood. It can on the other hand be advantageous to transform this shape into an elliptical sector, more crushed than a circular sector, in order to reduce the cross section of passage slightly on approaching the exit section. A slightly accelerated and more stable flow is thus created. Preferentially, the membrane 32 projects beyond the aerodynamic lines of the wall 50 by several centimetres in the radial direction. This radial projecting distance "Drs" can approximately be of the order of 50% to 90% of the radial flow-duct height 21B in line with the reverser, for example in the plane where the dimension line of the reference Drt" on FIG. 4 is located, this reference corresponding to the total radial distance of the reverser taken radially between the axis A1 and the trailing edge 78 of the main deflection portion 74 in the deployed configuration.

Figure 6:
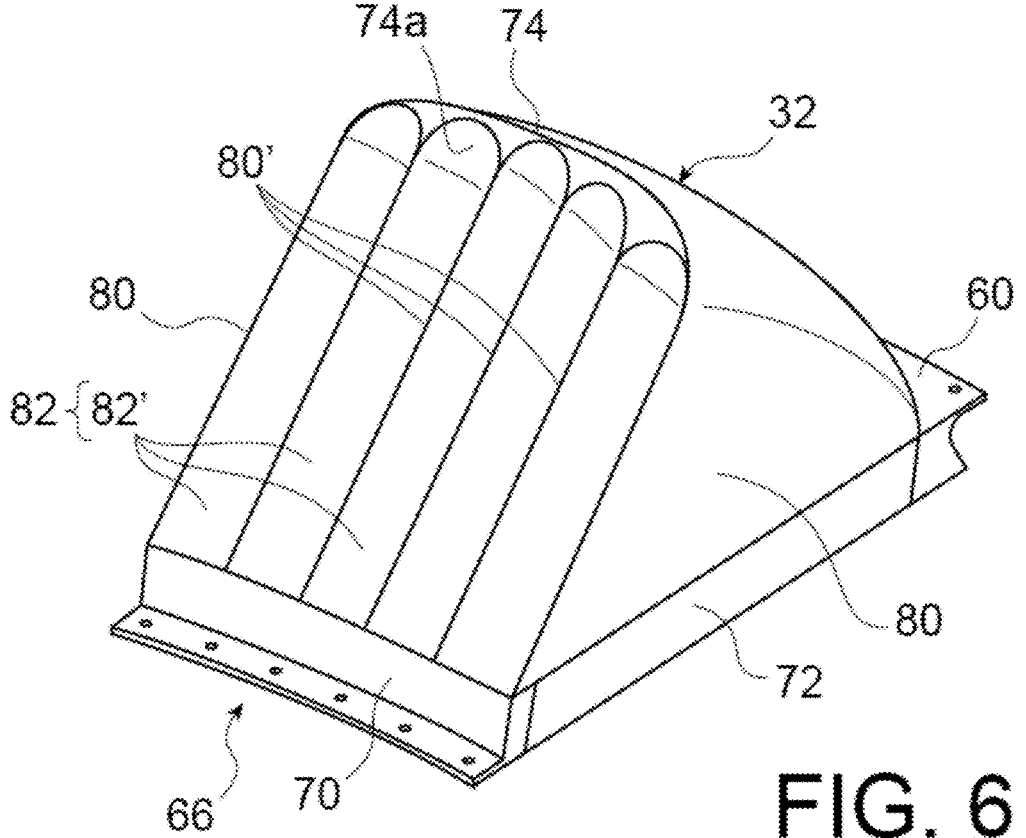
FIG. 6 is a perspective view similar to the one in the previous figure, with the deflection membrane shown according to an alternative.

In the first preferred embodiment described above, the downstream membrane 32 defines a single deflection channel 82. Nevertheless, according to an alternative embodiment shown on FIG. 6, the deflection channel 82 delimits, by means of intermediate radial flanks 80' parallel to the radial flanks 80 and located between them, a plurality of deflection compartments 82' circumferentially separated from each other. In this case, the main deflection portion 74 can remain with a continuous form in the circumferential direction, or be in the form of successive lobes in the circumferential direction, each new lobe being initiated at the radially external end of each radial flanks 80, 80'. In this multi-cell configuration, each lobe preferentially has its own longitudinal support frame included in the solid structure of the deflection membrane support. This multi-cell configuration of FIG. 6 is particularly recommended for being used in proximity to deflection blade vanes, or to membranes having a strong lateral deflection of the jet to provide the control of the flow during thrust reversal. As will be described hereinafter, the deflection compartments 82' can either remain purely axial, or make it possible to laterally deflect the exit flow until it is optionally perpendicular to the axis A1. In addition, the intermediate radial flanks 80' can be supported by intermediate stiffeners aligned with the orientation of the compartments that they define.

Figure 7:
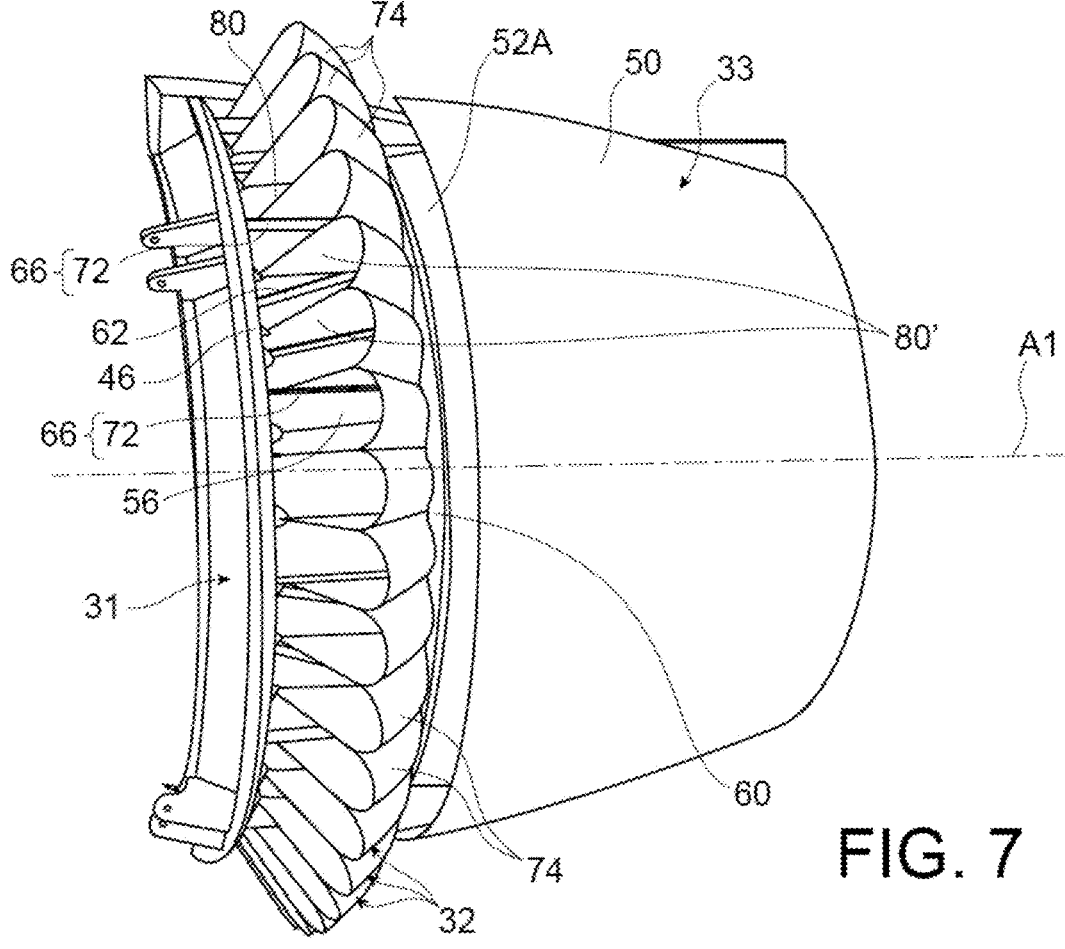
FIG. 7 is a partial perspective view of the reverser according to an alternative, and shown in a thrust-reversal configuration.
Figure 8:
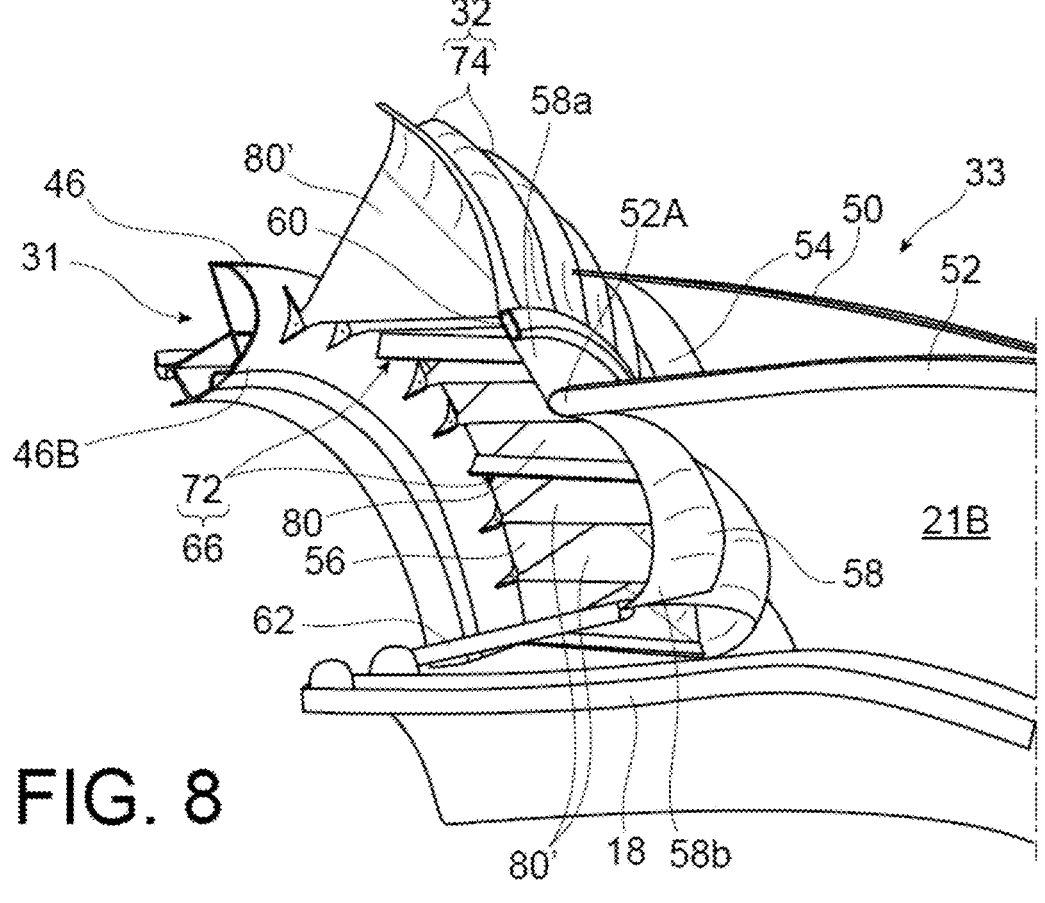
FIG. 8 is a partial perspective view similar to the one in the previous figure, at another viewing angle.
Figure 8A:
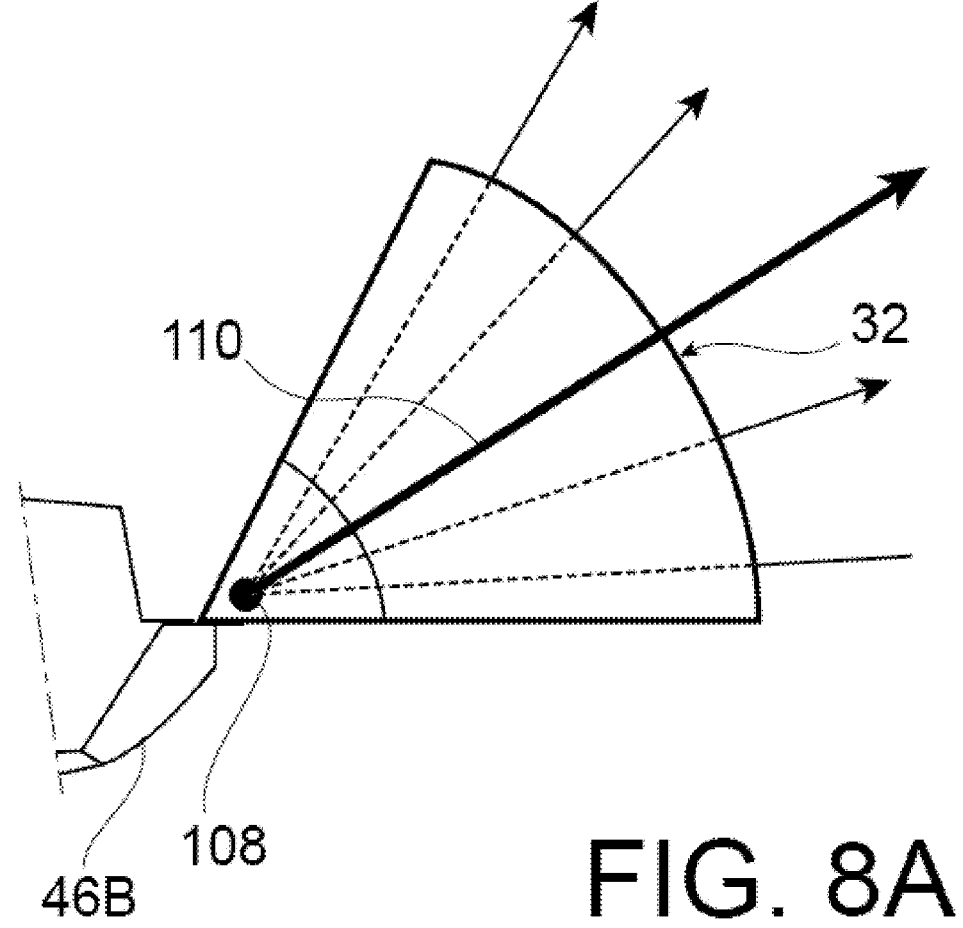
FIG. 8A is a partial view in longitudinal half-section, showing schematically the pressure forces applied to the deflection membrane.

Another variant shown on FIGS. 7 and 8 shows another alternative in which the support frames 66 of the various downstream membranes 32 are simplified. This is because, as shown on FIG. 8A, the pressure forces on the membrane 32 have a very forward point of application 108, much more forward than on a normal vane of blades. Whereas the resultant of the forces is applied almost at the middle of the vane of blades, the thrust resultant 110 of a membrane with a circular meridian is applied practically over its front part, at the junction with the front frame. This removes a significant part of the loads applied to the rear frame, and the frame holding the membrane in hood form then merely fulfils a role of stabiliser. Thus, under some conditions, the front framework 70 can be omitted, and the membranes 32 directly secured to the deflection edge 46B or to the front frame 46 of the fixed structure 31. In addition, the rear framework 60 becomes common to all the frames 66, extending over a large angular extent, which may for example be continuous over 180 to 360°.

Figure 9:
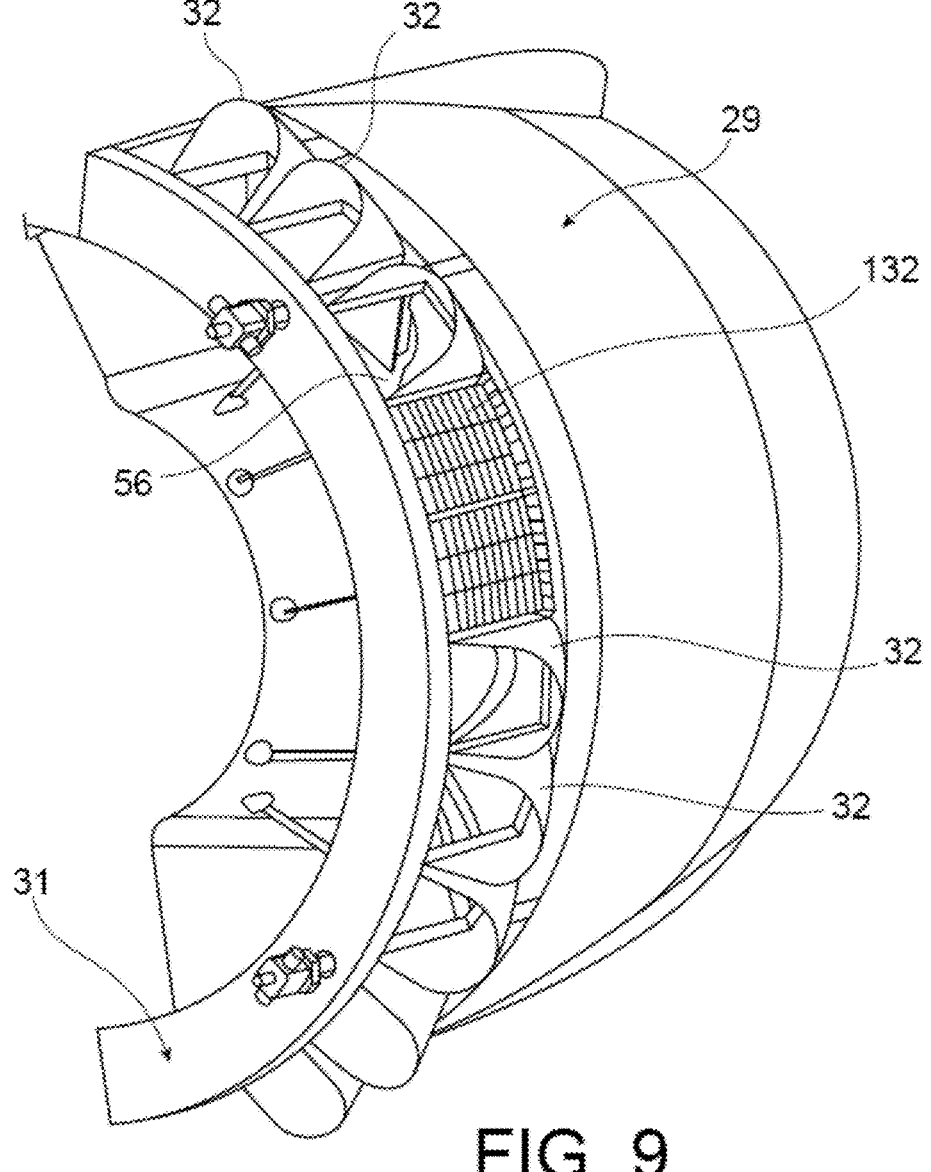
FIG. 9 is a partial perspective view of the reverser according to another alternative, and shown in a thrust-reversal configuration.

FIG. 9 shows another alternative for the first preferred embodiment, wherein a plurality of downstream membranes 32 are distributed circumferentially in the opening 56. However, these membranes 32 are not alone in the opening 56, but provided in combination with conventional cascade vanes 132, also located in the radial extraction opening 56. The membranes 32 and the vanes 132 can be provided in alternation, or, as shown on FIG. 9, this alternation may rather relate to groups of successive membranes 32 and groups of successive vanes 132. This configuration makes it possible to introduce slanting cascade vanes or high-deflection membranes for the purpose of improving control of the pathway of the bands of the thrust reverser in operation.

Figure 10:
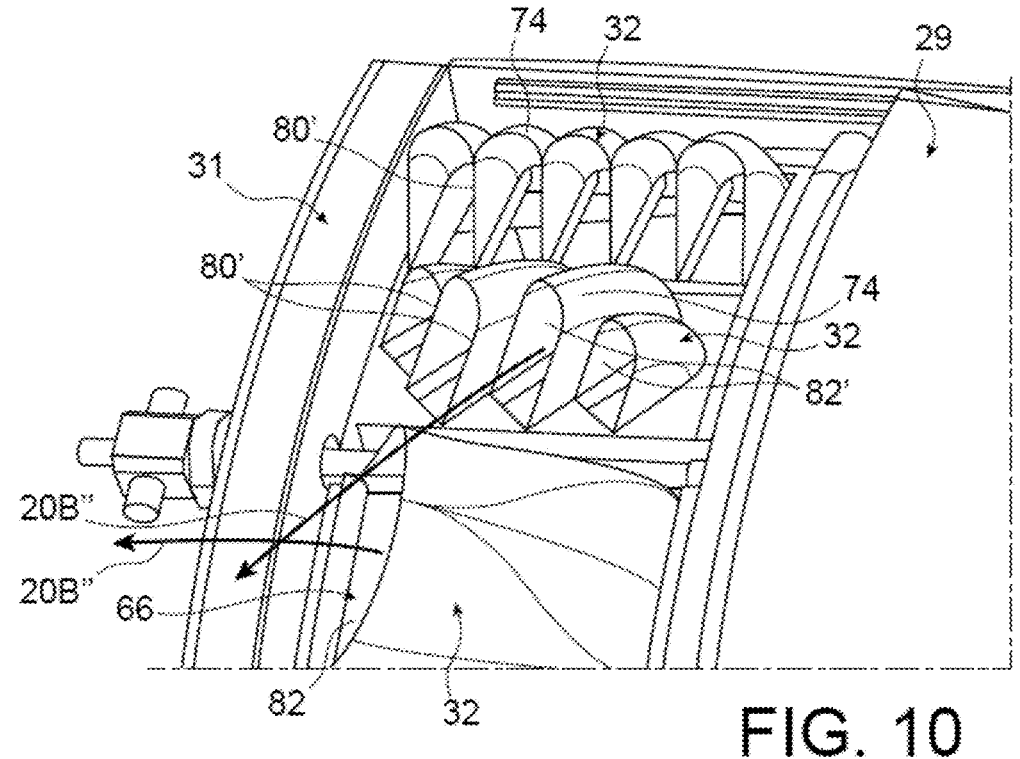
FIG. 10 is a perspective view of a part of the reverser shown on the previous figure, according to yet another alternative.

This configuration will use precisely with profit the alternative shown on FIG. 10, in which some membranes 32 can generate a counter-thrust flow 20B" with a zero tangential component, as is the case with the membrane 32 with a single channel 82 at the bottom of FIG. 10. For the membrane 32 with multi-compartments 82' shown at the middle of FIG. 10, the counter-thrust flow 20B" generated has a non-zero tangential component, for example between 30 and 60°. Likewise, one or more additional membranes 32 could be provided as required, generating an exit flow with a zero axial component and directed tangentially or mainly tangentially, as is the case with the membrane at the top of FIG. 10. This solution of membranes 32 with deflection at 90° and generating a zero axial thrust can therefore be provided in combination with other deflection membranes generating a counter-thrust flow with a non-zero axial component. In this case, all the deflection membranes can extend radially outwards beyond the movable reverser cowl, or only one or some of them, generating an exit flow with a zero or non-zero axial component.

Figure 11:
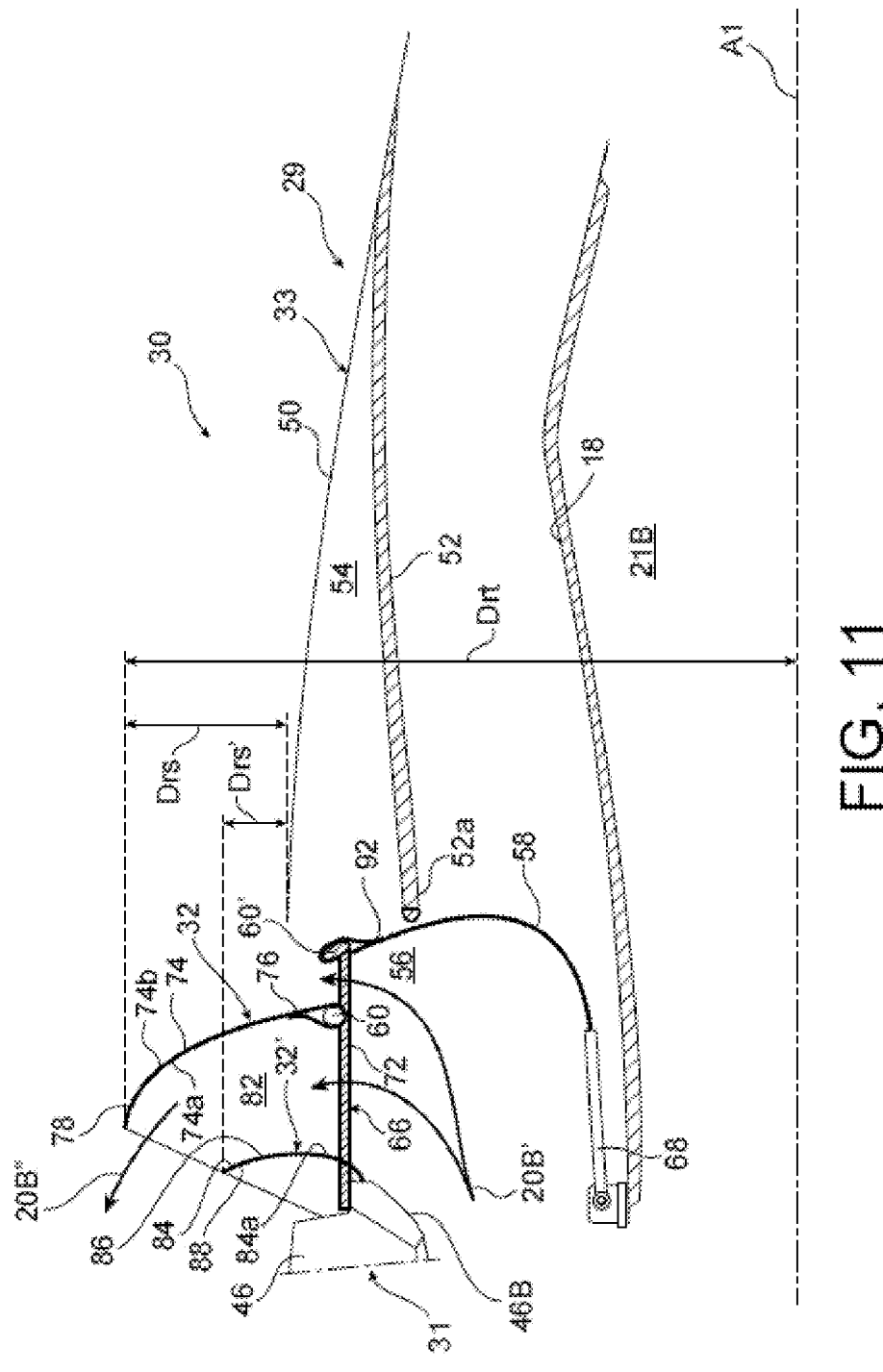
FIG. 11 is a view in longitudinal half-section of the reverser according to a second preferred embodiment of the invention, shown in a thrust-reversal configuration.

FIG. 11 shows a second preferred embodiment of the invention, repeating a major part of the features of the first embodiment, in particular the downstream deflection membrane 32. One or more upstream deflection membranes 32' are also added thereto, the purpose of which is also to divert forwards the part of the flow 20B' passing through the opening 56. Just as with the downstream membrane 32, a single upstream membrane 32' will be described hereinafter, on the understanding that it can have an angular extent identical to or different from that of the downstream membrane 32 through which one and the same radial and longitudinal plane passes. More precisely, the downstream deflection membrane 32' includes a main deflection portion 84, an active convex deflection surface 84a of which has a leading edge 86 secured to the rigid deflection edge 46B, this leading edge therefore being located at a front axial end of the radial extraction opening 56.

In operation, the secondary stream 20B passes through the secondary flow duct 21B, and comes at least partly to abut on the deployed sealing membrane 58, which forces the part 20B' of this flow to pass through the opening 56, and therefore to pass through the opening defined internally by the support frame 66. The flow of the flow part 20B' through the extraction opening 56 thus has the consequence, in addition to that related to the deployment by pressure of the downstream membrane 32, of putting the active external convex deflection surface 84a under negative pressure, an effect reinforced by the scooping of the external flow by the membrane 84a in its external part 88. This leads to deploying the upstream deflection membrane 32' to its fully deployed configuration shown on FIG. 11.

The deflection channel 82 is thus delimited between the two deflection surfaces 74a, 84a, each helping to divert flow part 20B' forwards, respectively by pressure and negative pressure/suction effect that thus generates an additional counter-thrust for the system.

The upstream membrane 32' can also comprise radial flanks (not visible on FIG. 11) secured to the fixed structure 31 and attached at the radially external end to the main deflection portion 84, to adopt a general form of "hood" around which the flow part 20B' is sucked. Thus these radial flanks do not participate in the delimitation of the deflection channel 82 but contribute to the required shaping of the main deflection portion 84. As can be seen on FIG. 11, the main portion 84 and its external active surface 84a can for example extend in the form of an arc of a circle or similar, preferably over an angular extent of between 75 and 90°, and with a radius less than that of the downstream membrane 32.

Intermediate radial flanks can also be provided as for the downstream membrane 32, without departing from the scope of the invention.

Still with a view to increased performances of the reverser and for a smaller sizing thereof, in this deployed configuration the downstream membrane 32' extends radially outwards beyond the movable reverser cowl 33 in the retracted thrust-reversal position. The membrane 32 can thus extend beyond the wall 50 of the cowl 33 over a projecting radial distance Drs', for example by several tens of centimetres. The data disclosed above for the projecting radial distance Drs are also applicable for this projecting radial distance Drs'.

It should be noted that, in this second preferred embodiment, the upstream membrane 32' in the non-deployed/folded configuration, adopted when the reverser is in the direct thrust configuration, is also arranged in the housing 54 of the movable cowl 33.

Figure 12:
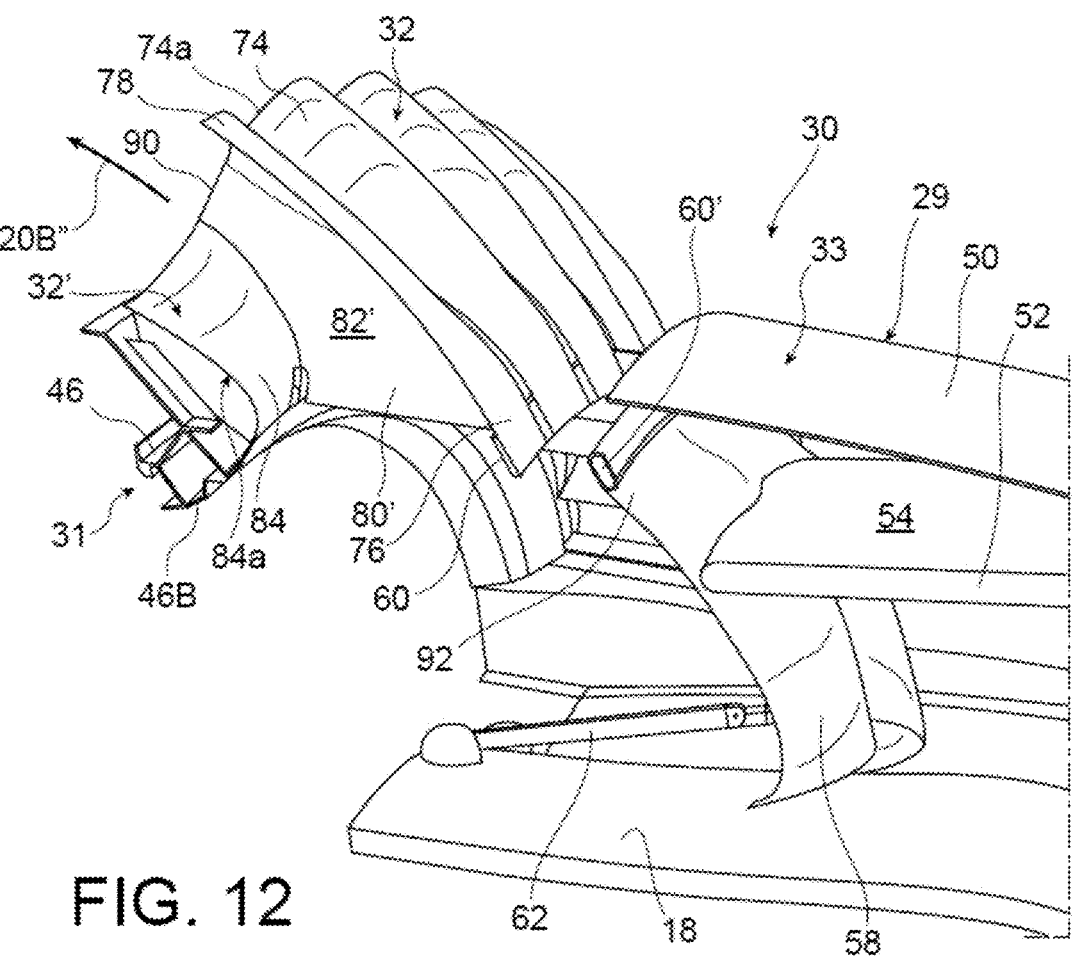
FIG. 12 is a perspective view of a part of the reverser shown on the previous figure.
Figure 13:
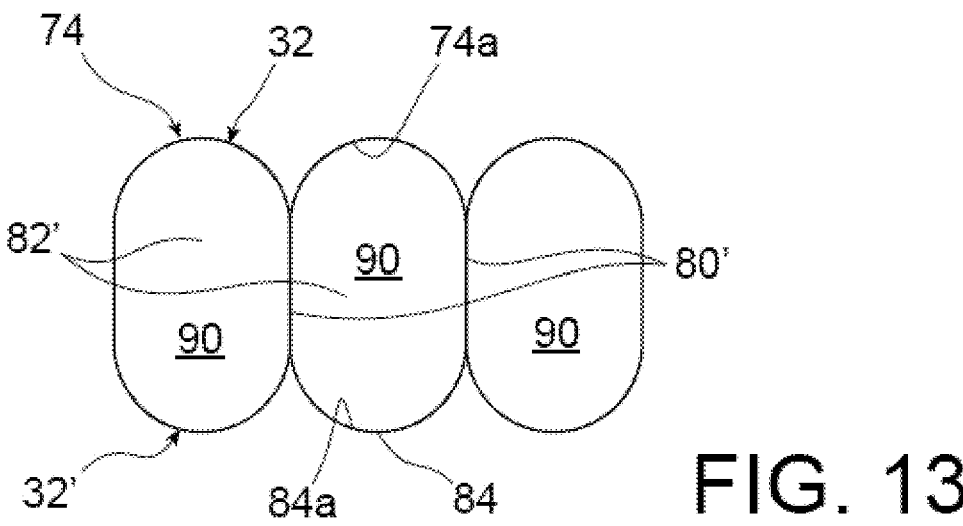
FIG. 13 is a front view showing the flow-extraction necks delimited by the upstream and downstream deflection membranes of the reverser shown on FIGS. 11 and 12.

FIGS. 12 and 13 show that the cooperation between the downstream membrane or membranes 32 and the upstream membrane or membranes 32' enable them to delimit together necks 90 for extracting the counter-thrust flow 20B". These necks 90, preferably circular, oblong or oval in shape, thus follow each other in the circumferential direction of the reverser, while being adjacent to each other.

The upstream membrane 32' thus makes it possible to extend the geometry of the rigid deflection edge 46B aerodynamically and, in combination with the downstream membranes 32, to circumscribe the flow part 20B' over 360° by means of the necks 90, without causing it to encounter obstacles liable to cause losses of performance.

In this second preferred embodiment shown on FIGS. 11 to 13, another particularity consists in providing an axial offset between the downstream deflection membrane 32 and the sealing membrane 58. Such a design can obviously be implemented in the first embodiment. More precisely, in the deployed configurations of the downstream membrane 32 and of the sealing membrane 58, the trailing edge 92 of the sealing membrane 58 is offset axially downstream with respect to the leading edge 76 of the active concave deflection surface 74a of the downstream membrane 32. This leading edge 76 of the active surface 74a of the membrane 32 remains secured to the rear framework 60 of the support frame 66 (round or profiled aerodynamically in thick form), while the trailing edge 92 of the sealing membrane 58 is secured to another rear framework 60' more to the rear and profiled as a trailing edge, optionally also incorporated in the frame 66. Preferably, this rear framework 60' is also common to several or all of the sealing membranes 58, extending appreciably angularly.

The axial offset described above affords an even greater gain in performance of the reverser, since the downstream portion of the flow part 20B' will also generate a high negative pressure/suction on the convex external surface 74b of the downstream membrane 32, opposite to the concave internal active surface 74a. This favours even more the diversion of the flow forwards.

The second preferred embodiment can also be implemented with an upstream membrane 32' that does not extend radially outwards beyond the movable cowl 33, this specificity then concerning only the downstream membrane 32.

Another possibility lies in keeping only the upstream membrane or membranes 32' to divert the flow forwards, and therefore to omit the downstream membrane or membranes 32. This is the subject of a third preferred embodiment of the invention, shown on FIGS. 14 to 16. In this third embodiment, the downstream membrane 32' no longer extends a rigid deflection edge of the fixed structure 31 but forms in addition this deflection edge 46B with the radially internal part of the membrane 32', close to its leading edge 86 or thereat. To do this, the fixed structure 31 includes a framework 96 to which the leading edge 86 of the membrane 32' is secured, corresponding to its radially interior end. At the downstream axial end of this flat framework 96, a cutout 98 is provided, with a form complementary to that of the upstream end 52A of the internal wall 52, received in this cutout 98 in the direct-thrust configuration. By judiciously adapting these two forms so that they are complementary and with gentle geometries, for example in an arc of a circle, the two membranes 32', 58 can be pressed in this cutout by the bearing of the upstream end 52A of the wall 52, without risk of damage to these membranes. The advantage of this configuration lies in the fact that, in direct jet (reverser closed), the two parts 96 and 52 fit together perfectly and the cavity between the panel 52 and the deflection edge 46B is thereby eliminated with a significant gain in performance. When the movable part of the reverser is moved towards the rear to reach the thrust-reversal configuration, the gripped parts of the membranes 32', 58 are released and can be deployed outside the cutout 98.

Figure 17:
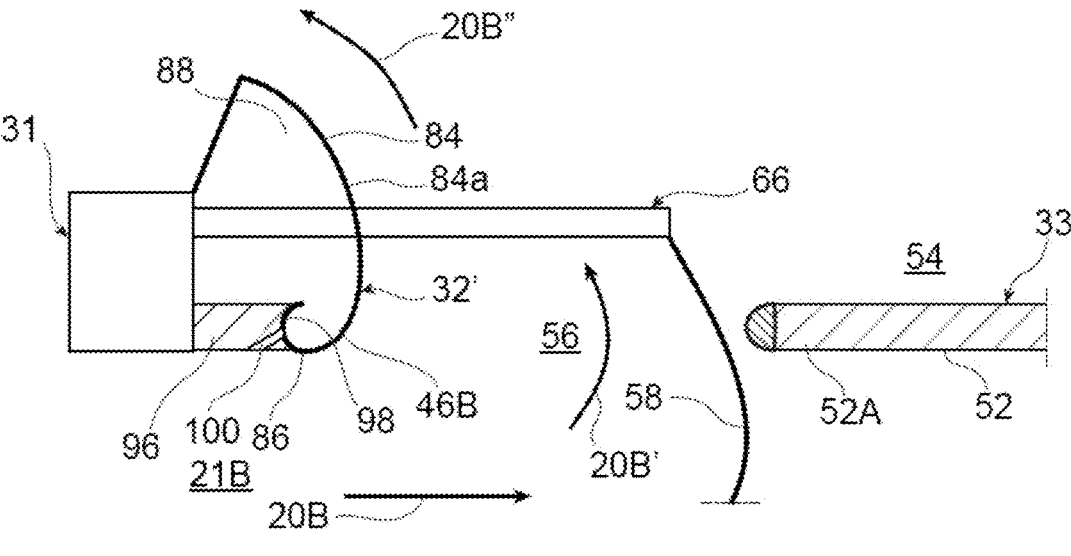
FIG. 17 is a view in longitudinal half-section similar to the one in FIG. 14 with the reverser shown according to an alternative in which the flexible deflection edge is sealed and inflatable, so as to be pressurised by the flow of the flow duct during opening in order to give it its optimum aerodynamic shape when the reverser is deployed.

Precisely with regard to the deployment of the upstream deflection membrane 32', this is therefore implemented simply by negative pressure/suction via the flow part 20B' that passes through the opening 56, and which is then itself diverted forwards by this membrane 32'. Nevertheless, to improve the deployment of the upstream membrane 32', the framework 96 can be pierced with one or more openings 100 emerging firstly in the secondary flow duct 21B and secondly facing the surface opposite to the active convex deflection surface 84a, for example in the cutout 98 as has been shown on the alternative in FIG. 17. This confers an aid to the deployment of the upstream membrane 32', by pressure of the air coming from the secondary flow duct 21B and passing through the dedicated openings 100. In this configuration, the membrane 32' closes on itself in its upper part in a substantially airtight manner, and is inflated by the openings 100. This configuration is preferred if a lower expansion ratio is used in thrust reversal, which did not make it possible to have sufficient negative pressure to stabilise the deployed membrane 32'.

Figure 18:
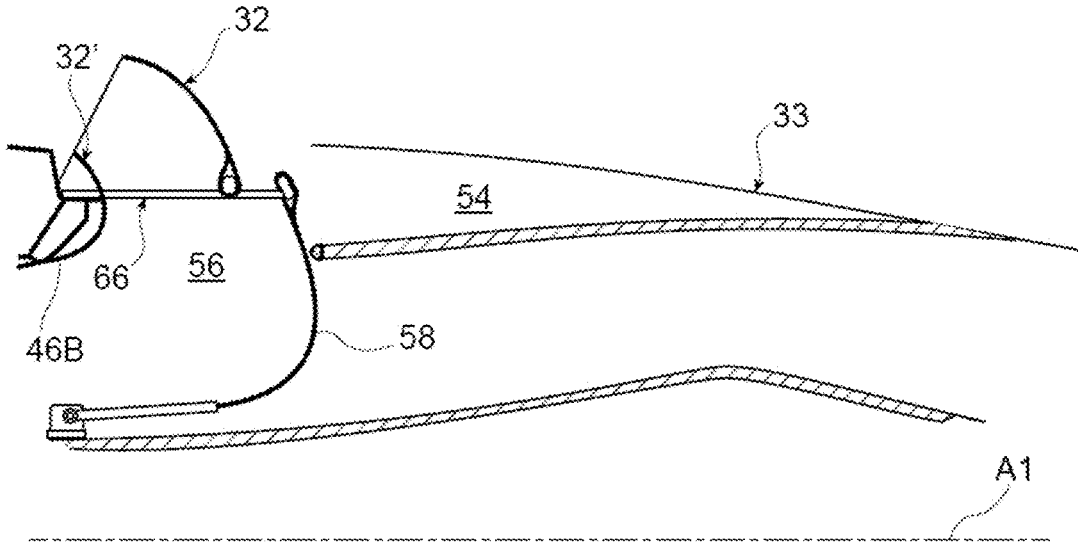
FIG. 18 is a view in longitudinal half-section similar to the one in FIG. 11 with the reverser shown according to a fourth preferred embodiment of the invention, in a thrust-reversal configuration.

The following figures are other embodiments and/or other alternatives, among which FIG. 18 shows a fourth preferred embodiment used so as to simultaneously provide one/several downstream deflection membranes 32, and one/several upstream deflection membranes 32' that do not necessarily extend beyond the movable reverser cowl 33 in the radial outward direction. Here the upstream membrane 32' extends radially outwards in a reduced way, but forms the deflection edge 46B with its radially interior part. It can moreover be replaced by a fixed deflection edge, extended according to the design objective sought.

Figure 19:
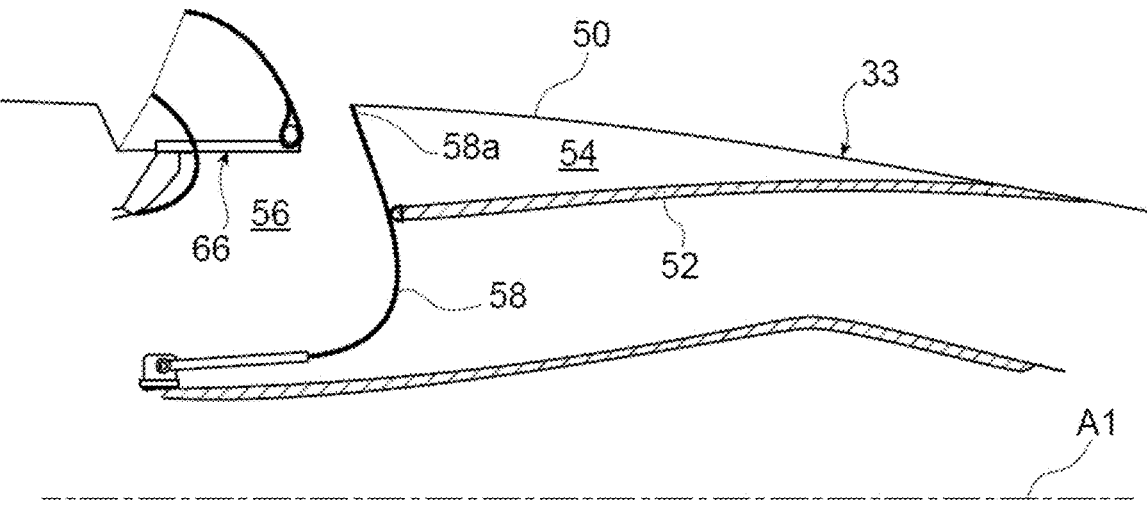
FIG. 19 is a view in longitudinal half-section similar to the one in the previous figure with the reverser shown according to an alternative.

In the alternative shown on FIG. 19, the sealing membrane 58 is no longer secured to the support frame 66 of the downstream membrane 32, but its end 58a is secured to the upstream end of the external wall 50 of the movable reverser cowl 33.

This configuration makes it possible to shorten the aerodynamic lines of the nacelle in an optimised manner without worrying about the frames 60 or 60', which constitute an aerodynamic hard spot in the prior art.

Figure 14:
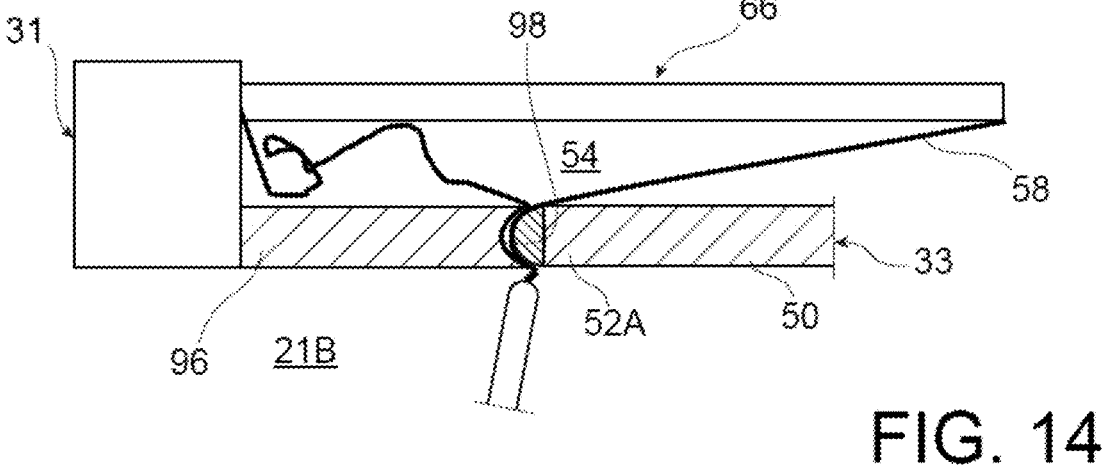
Fig. 14 is a view in longitudinal half-section of the reverser according to a third preferred embodiment of the invention, shown in a direct-thrust configuration.
Figure 15:
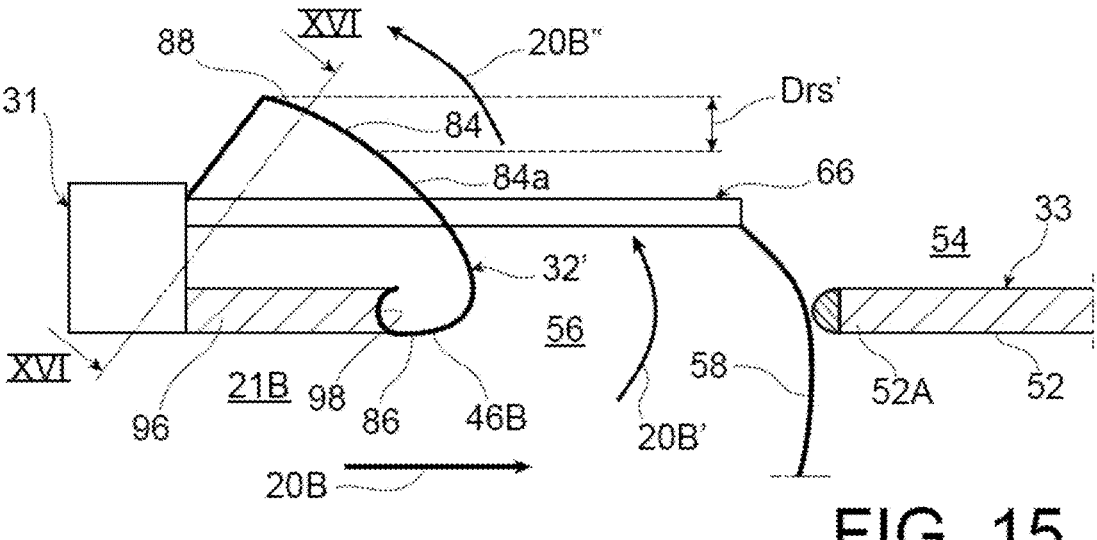
FIG. 15 is a view in longitudinal half-section similar to the one in the previous figure with the reverser shown in a thrust-reversal configuration.
Figure 16:
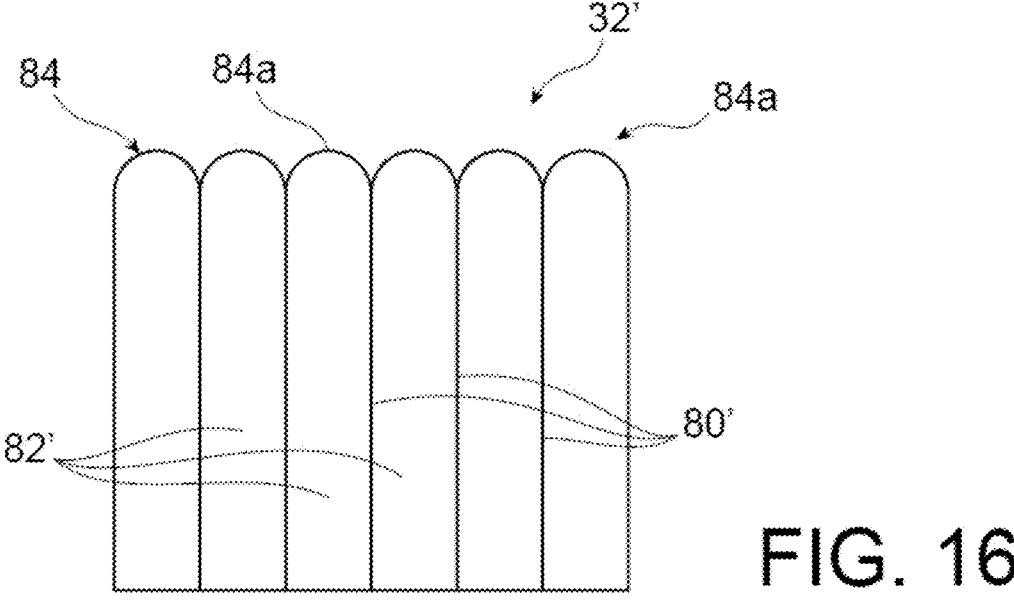
FIG. 16 is a view in cross section taken along the line XVI-XVI in FIG. 15.
Figure 20:
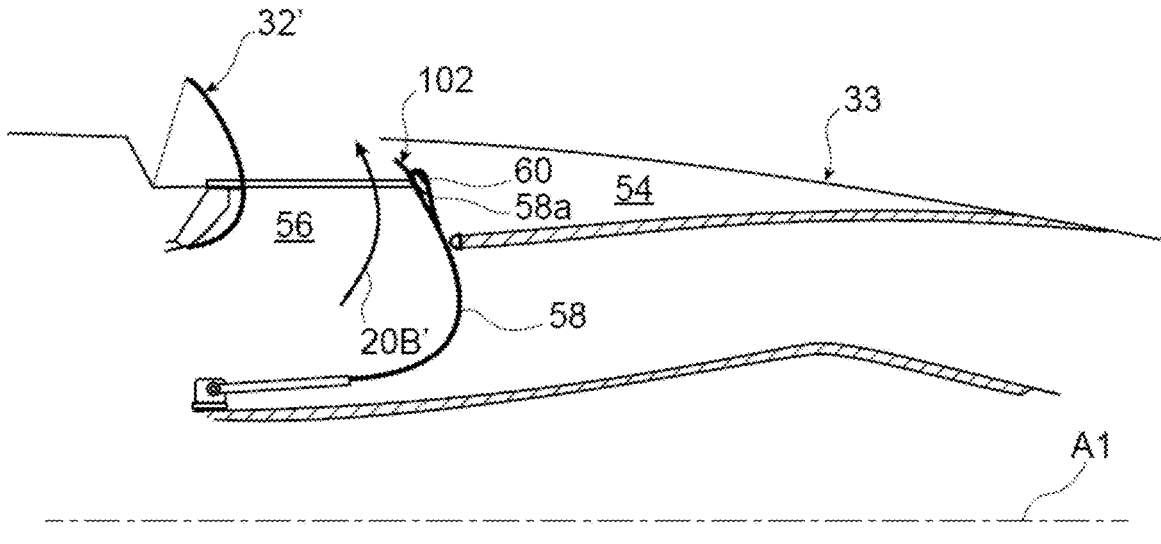
FIG. 20 is a view in longitudinal half-section similar to the one in FIG. 18 with the reverser shown according to a fifth preferred embodiment of the invention, in a thrust-reversal configuration.

In the fifth preferred embodiment in FIG. 20, the reverser is very similar to that of the third embodiment in FIGS. 14 to 16, except that the end 58a of the sealing membrane 58 is extended beyond the framework 60 by a rigid blade 102 helping to divert the flow part 20B' forwards. This rigid flow-diversion blade 102 has a limited radial height, so as to be easily inserted in the housing 54 in the direct-thrust configuration.

Figure 21:
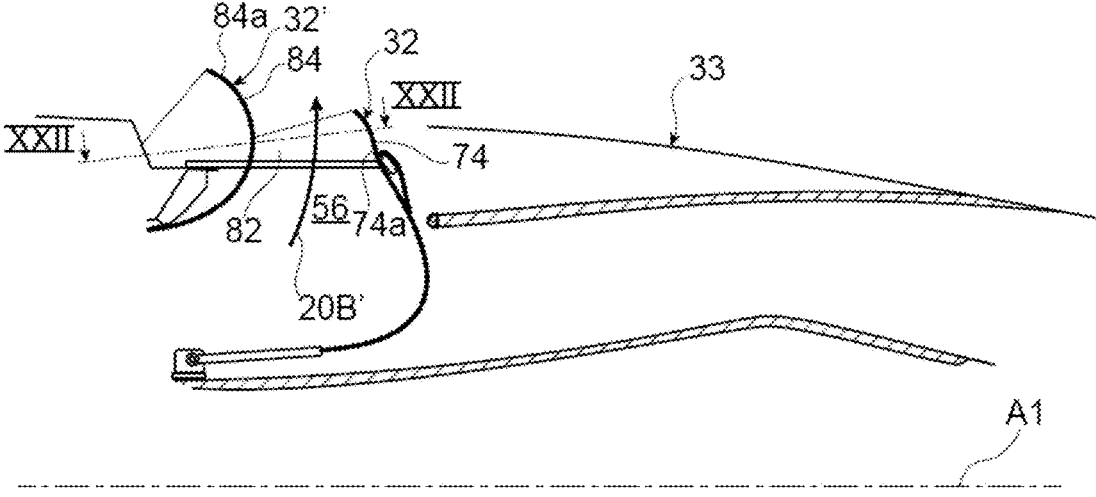
FIG. 21 is a view in longitudinal half-section similar to the one in FIG. 18 with the reverser shown according to a sixth preferred embodiment of the invention, in a thrust-reversal configuration.
Figure 22:
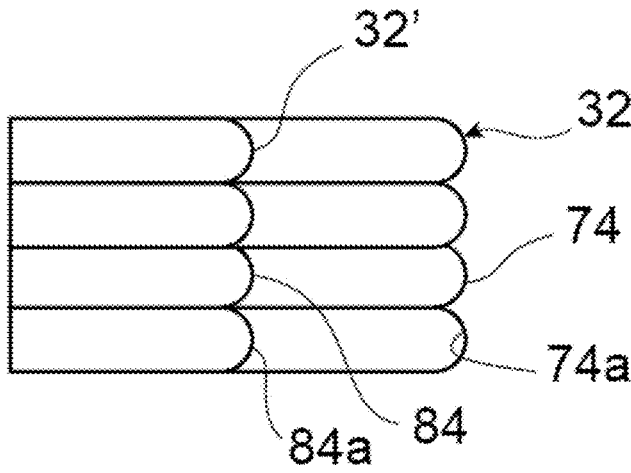
FIG. 22 is a view in cross section taken along the line XXII-XXII in FIG. 21.
Figure 23:
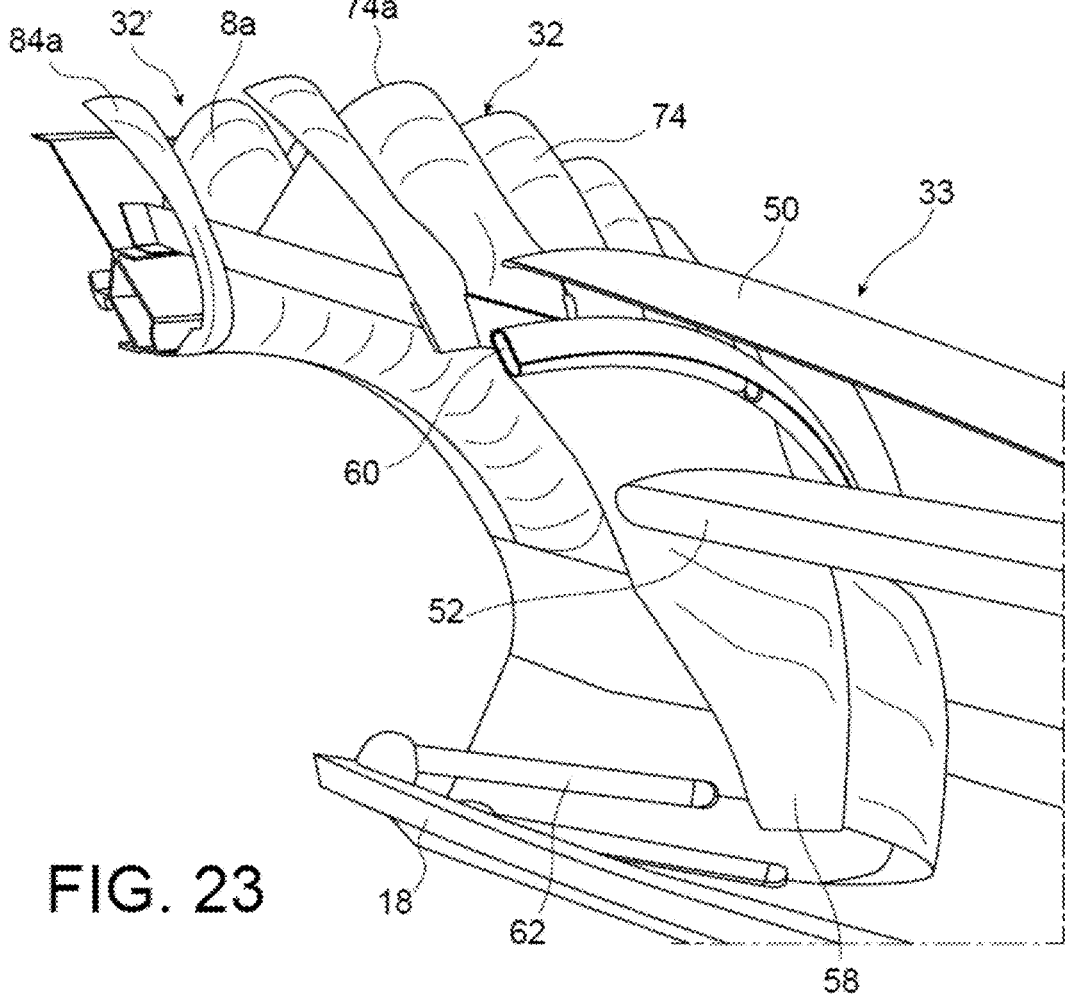
FIG. 23 is a perspective view of the reverser shown on FIGS. 21 and 22, in a thrust-reversal configuration.

In the sixth preferred embodiment shown on FIGS. 21 to 23, the rigid blade 102 is replaced by a downstream membrane 32 of reduced radial height, less than that of the upstream deflection membrane 32' that in its case extends beyond the movable cowl 33, in the radial direction outwards. Moreover, in the embodiment in FIG. 21, and optionally in other embodiments, the deflection membrane 32 and the sealing membrane 58 are substantially in line with each other, to constitute a sealing channel for deflecting the secondary flow.

Figure 24:
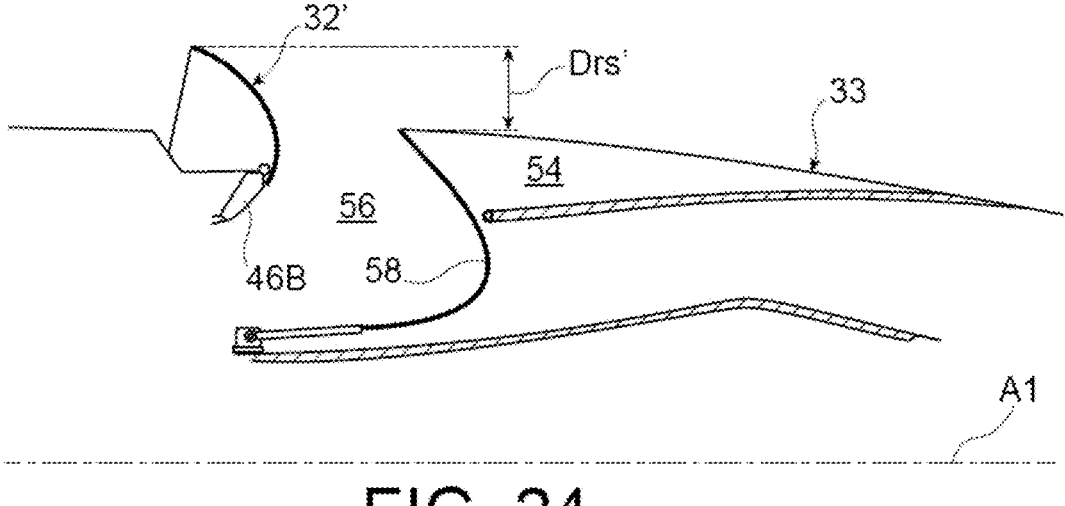
FIG. 24 is a view in longitudinal half-section similar to the one in FIG. 19 with the reverser shown according to a seventh preferred embodiment of the invention, in a thrust-reversal configuration.

Finally, FIG. 24 shows a seventh preferred embodiment similar to the alternative in FIG. 19, with as differences the omission of the downstream membrane 32 and the outward radial broadening of the upstream membrane 32'. Likewise, this once again extends the rigid deflection edge 46B, instead of forming it as on FIG. 19. In this seventh preferred embodiment, the presence of the support frame 66 is no longer useful, and it can therefore be omitted to reduce the total mass of the reverser. This last embodiment can advantageously be combined with the one where the upstream membrane 32' constitutes an inflatable chamber associated with a flat deflection edge 96.

The 25 affords a comparison of the performances between the conventional solution with bladed vanes 132 and the solution with deflection membranes 32, 32' according to the invention. This is because it is shown on this figure that, for the same axial size, the delivering cross section "Sm" produced at the exit from the membranes 32, 32' is much greater than the delivering cross section "Sg" produced by the deflection bladed vanes 132.

Figure 25:
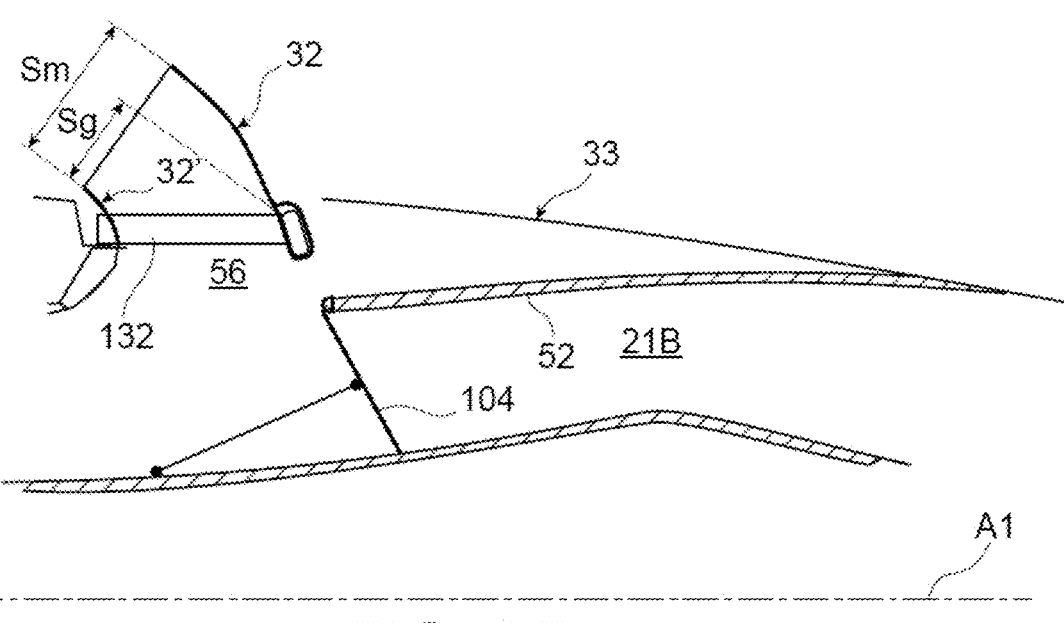
FIG. 25 is a view in longitudinal half-section of the reverser allowing a comparison of the performances between the conventional solution with bladed vanes and the solution with deflection membranes according to the invention.

On this FIG. 25, it has moreover been shown that the sealing of the secondary flow duct 21B can be implemented by conventional sealing flaps 104 without departing from the scope of the invention.

Various modifications may be made by a person skilled in the art to the invention that has just been described, by way of non-limiting examples only, the scope of which is defined by the appended claims. For example, the thrust reverser 30 can alternately have a "C" or "O" architecture. In addition, all of the features disclosed above, in the various preferred embodiments and their alternatives, can be combined together. Moreover, it should be noted that on all of the figures that have been described above, the elements that bear the same numerical references correspond to identical or similar elements.

The invention claimed is:

1. Thrust reverser for an aircraft propulsion unit, the reverser comprising a fixed structure equipped with a wall for the radially internal delimitation of a secondary flow duct of the propulsion unit intended to have a secondary flow pass through it, the reverser also comprising a movable structure comprising at least one movable reverser cowl equipped with a radially internal reverser cowl wall delimiting the secondary flow duct radially outwards, the movable structure being movable in translation with respect to the fixed structure on a longitudinal central axis of the reverser, between an advanced direct-thrust position and a retracted thrust-reversal position in which the movable structure and the fixed structure define axially between them, on the secondary flow duct, an opening for radial extraction of at least part of the secondary flow, wherein the thrust reverser also comprises at least one deployable deflecting membrane designed to deflect at least part of the secondary flow escaping from the radial extraction opening, when this deflecting membrane is in a deployed configuration adopted when the movable structure is in the retracted thrust-reversal position, and in that, in this deployed configuration said at least one deflecting membrane extends radially outwards beyond the movable reverser cowl in the retracted thrust-reversal position.

2. Thrust reverser according to claim 1, wherein said at least one deflecting membrane includes a downstream deflecting membrane a concave deflecting active surface of which has a leading edge preferably located at a rear axial end of the radial extraction opening, said concave active deflecting surface being pressurised by said at least part of the secondary flow escaping from the radial extraction opening.

3. Thrust reverser according to claim 1, wherein said at least one deflecting membrane includes an upstream deflecting membrane a convex deflecting active surface 84*a*) of which has a leading edge preferentially located at a front axial end of the radial extraction opening, said convex active deflecting surface being put under negative pressure by said at least part of the secondary flow escaping from the radial extraction opening.

4. Thrust reverser according to claim 2, wherein said downstream deflecting membrane includes, circumferentially on either side of its active concave deflecting surface, respectively two radial flanks conjointly delimiting, with the active concave deflecting surface, a channel deflecting forwards said at least part of the secondary flow escaping from the radial extraction opening.

5. Thrust reverser according to claim 4, wherein said deflecting channel delimits, by way of intermediate radial flanks, a plurality of deflection compartments circumferentially separated from each other.

6. Thrust reverser according to claim 4, wherein said downstream deflection membrane is secured to a support frame, preferably with an overall square or rectangular shape, arranged in the radial extraction opening.

7. Thrust reverser according to claim 1, wherein a plurality of deflection membranes follow each other circumferentially in the radial extraction opening, optionally in combination with cascade vanes also located in the radial extraction opening, between the deflection membranes.

8. Thrust reverser according to claim 3, wherein the upstream deflection membrane, in its deployed configuration, extends a rigid deflection edge of the fixed structure, or forms this same deflection edge.

9. Thrust reverser according to claim 1, further comprising at least one deployable sealing membrane which, in a configuration deployed in the secondary flow duct, is designed to deflect at least part of the secondary flow towards the radial extraction opening when the movable structure is in the retracted thrust-reversal position.

10. Thrust reverser according to claim 2, wherein, in the deployed configurations of the downstream deflection membrane and of the sealing membrane, a trailing edge of the sealing membrane is offset axially downstream with respect to the leading edge of the active concave diversion surface of the downstream membrane.

11. Thrust reverser according to claim 2, further comprising one or more downstream deflection membranes as well as one or more upstream deflection membranes, delimiting together one or more necks for extracting a counter-thrust flow.

12. Thrust reverser according to claim 1, wherein said at least one deflection membrane is mounted on the fixed structure of the reverser.

13. Nacelle for an aircraft propulsion unit, comprising at least one fan cowl, as well as the thrust reverser according to claim 1.

14. Propulsion unit for an aircraft, comprising a turbine engine and the nacelle according to claim 13.

\* \* \* \* \*